(12) United States Patent  
Aisenbrey

(10) Patent No.: US 7,708,920 B2
(45) Date of Patent: May 4, 2010

(54) CONDUCTIVELY DOPED RESIN MOLDABLE CAPSULE AND METHOD OF MANUFACTURE

(75) Inventor: Thomas Aisenbrey, Littleton, CO (US)

(73) Assignee: Integral Technologies, Inc., Bellingham, WA (US)

(*) Notice: Subject to any disclaimer, the term of this patent is extended or adjusted under 35 U.S.C. 154(b) by 691 days.

(21) Appl. No.: 11/313,015

(22) Filed: Dec. 20, 2005

(65) Prior Publication Data

US 2006/0131547 A1 Jun. 22, 2006

Related U.S. Application Data

(63) Continuation-in-part of application No. 10/877,092, filed on Jun. 25, 2004, which is a continuation of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/317,808, filed on Sep. 7, 2001, provisional application No. 60/269,414, filed on Feb. 16, 2001, provisional application No. 60/268,822, filed on Feb. 15, 2001, provisional application No. 60/638,080, filed on Dec. 21, 2004.

(51) Int. Cl.
*B29C 47/02* (2006.01)
*B32B 15/08* (2006.01)

(52) U.S. Cl. ............. 264/104; 264/105; 264/149; 264/171.13; 264/171.14; 264/211.12

(58) Field of Classification Search ......... 264/104, 264/105, 149, 171.11, 171.13, 171.14, 171.15, 264/211.12
See application file for complete search history.

(56) References Cited

U.S. PATENT DOCUMENTS

| | | | | | |
|---|---|---|---|---|---|
| 2,919,970 | A | * | 1/1960 | Russell | 65/445 |
| 2,929,108 | A | * | 3/1960 | Sands | 264/105 |
| 3,694,131 | A | * | 9/1972 | Stuart | 425/461 |
| 4,379,102 | A | * | 4/1983 | Kertscher | 264/40.7 |
| 4,521,173 | A | * | 6/1985 | Hilker et al. | 425/113 |

(Continued)

FOREIGN PATENT DOCUMENTS

| JP | 58068007 | A | * | 4/1983 |
|---|---|---|---|---|
| JP | 63189208 | A | * | 8/1988 |

OTHER PUBLICATIONS

Kosuge et al. JP 63189208 Partial Translation, provided by USPTO translation staff on Mar. 26, 2009.*
Human Translation of Kosuge et al., JP 63-189208 A.*

*Primary Examiner*—Joseph S Del Sole
*Assistant Examiner*—Ryan Ochylski
(74) *Attorney, Agent, or Firm*—Douglas R. Schnabel

(57) ABSTRACT

A method to form moldable capsules of a conductively doped resin-based material is realized. The method comprises compressing a bundle of micron conductive fiber strands by passing the bundle through a compressing ring. A resin-based material is extruded/pultruded onto the compressed bundle. The resin-based material and the bundle are sectioned into moldable capsules. The micron conductive fiber comprises between about 20% and about 50% of the total weight of each moldable capsule.

28 Claims, 9 Drawing Sheets

U.S. PATENT DOCUMENTS

| | | | |
|---|---|---|---|
| 4,816,184 A * | 3/1989 | Fukuda et al. | 252/511 |
| 4,818,630 A * | 4/1989 | Beaton | 428/605 |
| 5,324,377 A * | 6/1994 | Davies | 264/171.13 |
| 5,433,419 A * | 7/1995 | Murakami | 264/136 |
| 5,571,326 A * | 11/1996 | Boissonnat et al. | 118/405 |
| 5,658,513 A * | 8/1997 | Amaike et al. | 264/171.13 |
| 6,261,437 B1 * | 7/2001 | Hernnaes et al. | 205/324 |
| 6,610,146 B1 * | 8/2003 | Peng et al. | 118/125 |
| 7,045,010 B2 * | 5/2006 | Sturman, Jr. | 118/125 |
| 2002/0108699 A1 * | 8/2002 | Cofer et al. | 156/176 |
| 2003/0044135 A1 * | 3/2003 | Sturman, Jr. | 385/100 |
| 2004/0077771 A1 * | 4/2004 | Wadahara et al. | 524/495 |

* cited by examiner

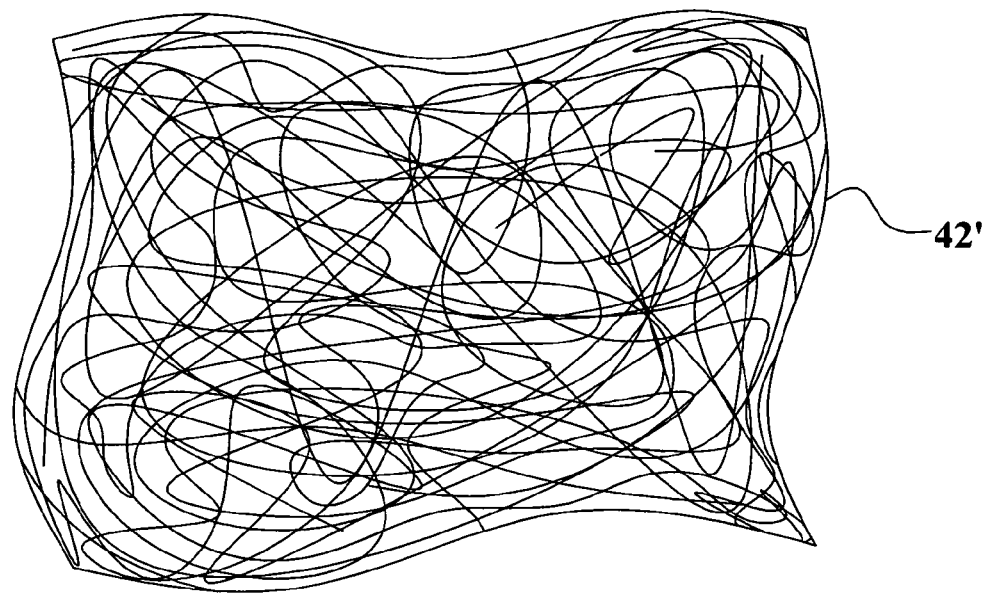
FIG. 5b
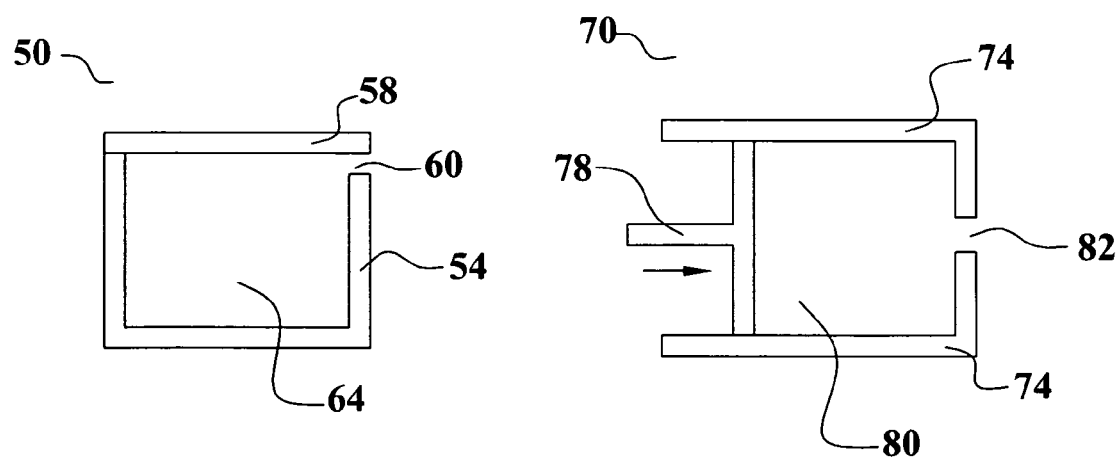
FIG. 6a          FIG. 6b

CONDUCTIVELY DOPED RESIN MOLDABLE CAPSULE AND METHOD OF MANUFACTURE

RELATED PATENT APPLICATIONS

This Patent Application claims priority to the U.S. Provisional Patent Application 60/638,080 filed on Dec. 21, 2004, which is herein incorporated by reference in its entirety.

This Patent application is a Continuation-in-Part of INT01-002CIPC, filed as U.S. patent application Ser. No. 10/877,092, filed on Jun. 25, 2004, filed as U.S. patent application Ser. No. 10/309,429, filed on Dec. 4, 2002, now issued as U.S. Pat. No. 6,870,516, also incorporated by reference in its entirety, filed as U.S. patent application Ser. No. 10/075,778, filed on Feb. 14, 2002, now issued as U.S. Pat. No. 6,741,221, which claimed priority to U.S. Provisional Patent Application Ser. No. 60/317,808, filed on Sep. 7, 2001, Ser. No. 60/269,414, filed on Feb. 16, 2001, and Ser. No. 60/268,822, filed on Feb. 15, 2001, all of which are incorporated by reference in their entirety.

BACKGROUND OF THE INVENTION

Field of the Invention

This invention relates to conductive polymers and, more particularly, to conductively doped resin-based materials for molding comprising micron conductive powders, micron conductive fibers, or a combination thereof, substantially homogenized within a base resin when molded. Even more particularly, this invention relates to a moldable capsule, and a method for forming such a moldable capsule, wherein this moldable capsule is useful for molding conductive articles usable within the EMF electronic, acoustical, and thermal spectrums.

SUMMARY OF THE INVENTION

Resin-based polymer materials are used for the manufacture of a wide array of articles. These polymer materials combine many outstanding characteristics, such as excellent strength to weight ratio, corrosion resistance, electrical isolation, and the like, with an ease of manufacture using a variety of well-established molding processes. Many resin-based polymer materials have been introduced into the market to provide useful combinations of characteristics.

In a typical scenario, resin-based polymer materials are manufactured in bulk quantities by chemical manufacturers. The resin-based material is then typically combined with fillers, additives, colorants, lubricants, and other particular materials that are required for the molding application through a process called compounding. The compounded resin-based material is typically in the form of pellets, sheets, rods, or lumps. The compounded material is typically of uniform size, shape, and chemical constituency. At the molding operation, the compounded resin-based material is loaded into a molding apparatus, such as an injection-molding machine, compression molding machine or an extrusion machine, and melted during the molding cycle. The molten material is injected by force into a mold cavity, or through a molding die to form the desired shape.

In spite of many outstanding characteristics, resin-based polymer materials are unfortunately, typically poor conductors of thermal and electrical energy. Low thermal conductivity can be an advantageous in applications, such as cooking pan handles or electrical insulators. In other cases, however, resin-based materials known as insulators conduct thermal or electrical energy poorly and are not useful. Where high thermal or electrical conductivity is required, conductive metals, such as copper or aluminum or other metals, are typically used. A disadvantage of solid metal conductors is the density of these materials. For an example in electrical and thermal applications such as used in aircraft, satellites, vehicles, or even in hand held devices the weight due to solid metal conductors is significant. It is therefore desirable to replace solid metal conductors with less dense materials. Since resin-based materials are typically much less dense than metals, and can have the strength of metals, these materials would theoretically be good replacements for metals. However, the problems of low conductivity and doping must be resolved.

Attempts have been made in the art to create thermally and electrically conductive resin-based materials. There are two general classifications of such materials, intrinsically conductive and non-intrinsically conductive. Intrinsically conductive resin-based materials, which may also be referred to as conjugated resins, incorporate complex carbon molecule bonding within the polymer, increasing the conductivity of the material. Unfortunately, intrinsically conductive resin-based materials typically are difficult to manufacture, very expensive and are limited in conductivity. Non-intrinsically conductive resin-based materials, which also may be referred to as doped materials, are formed by mixing conductive fillers or dopants, such as conductive fibers, powders, or combinations thereof, within a base resin materials, resulting in increased conductivity in a molded form. Metallic and non-metallic fillers have been demonstrated in the art to provide substantially increased conductivity in a composite material while maintaining competitive cost.

However, non-intrinsically conductive resin-based materials that have been demonstrated in the art forms suffer from several well-known problems. A first problem is poor structural material performance due to excessive conductive dopant loading. To achieve low resistivity, most prior art conductive resin-based materials require a conductive dopant percentage that is so high that the specified base resin material properties are compromised. The resulting molded articles are weakened, brittle and thus commercially undesirable. In addition, the excessive conductive loading in the doped materials prematurely wears molding machine components such as screws, barrels and molds.

A second well-known problem in the art is the difficulty of the molding cycle to properly mix the base resin and conductive filler to create a molded article with consistent electrical, thermal, and mechanical properties. To create an optimally stable material, the conductive dopants must form an interconnected network within and throughout the polymer matrix of base resin. To achieve a uniform conductive network, the conductive filler particles preferably have substantial length to width aspect ratios, are sized in proportion to the polymer chain molecules, and are substantially homogenized throughout the base resin. A high aspect ratio of the dopant particles increases the available contact points for each particle, extending the conductive network thru out the molded article or part. Appropriate particle size and allocation allows the conductive dopants to be dispersed within the polymer matrix without disrupting the polymer chains or adversely affecting the structural properties of the resin-based materials. Homogeneous dispersal of the conductive filler throughout the polymer matrix insures that the conductive network extends proportionately throughout the resin-based material. Intuitively, substantially homogeneous dispersal could be achieved through an extensive or aggressive molding cycle of the molding process. However, the conductive dopant particles are typically in microns in diameter, and these dopant particles can be adversely damaged or broken during melting, mixing and the forces of the molding cycle. If the conductive dopants become damaged, the aspect ratio of the dopant can becomes pulverized and the multiple points of contact between conductive particles are then minimized. The result is, the conductive network aspect ratio is lessened resulting in a low level electrical, thermal and acoustical continuity within the formed article or molded part.

One prior art approach to molding a conductive resin-based material is the use of "concentrate" pellets and "salt and pepper" blends. Concentrate pellets comprise a bundle of conductive filler particles that are bound together by a minuet amount of a resin-based material. The resulting concentrate pellet acts as a carrier to provide a means for adding measured amounts of conductive concentrate combined with a natural plastic or resin based base material. The concentrate pellets bond with only minimal amounts of base resin material are not capable as a standalone molding material due to the high concentration of filler particles. Therefore, a substantial quantity of pure resin-based pellets must be added to the concentrate pellets to produce a moldable blend. This dry blend mixture of concentrate pellets and base resin pellets are loaded into the hopper of a molding machine forming a blend that is commonly called a "salt and pepper" mixture. This two part dry blend is then gravity fed into the barrel of the molding machine heated and further mixed, melted, and compressed as it travels through the molding machine screw and barrel zones. The conductive filler particles are released from the concentrate pellets during melting and, are then dispersed throughout the mixture. The molten mixture is then forced, or shot, under high pressure into a mold cavity to form a molted article or part. Shear forces and pressures within the molding cycle, may cause damage the conductive particles while further damaging and decreasing the aspect ratio of conductive particles due to the time release of the particles in a thin wall carrier of a concentrate.

The "salt and pepper" blend that is transformed from the combination of pure resin-based pellets and concentrate pellets into a mixture exhibits several shortcomings. First, it is very difficult, if not impossible, to create a uniform homogeneous mixing of the filler material throughout the molten plastic using this technique for several reasons. First, the concentrate pellets have a different specific gravity than the base resin pellets, and while being gravity fed thru a hopper in conjunction with the base resin pellets they will not feed into the machine at an equal rate, thus the concentrations are not equal within the base resin. Also as the pellets begin to melt making their way thru the different zones of the screw and barrel of the molding machine, they will exhibit a different resonating frequency exhibiting different flow behaviors. As a result, substantial variation is seen in the concentration of conductive filler within the base resin. Second, during the molding cycle, the filler particles in the molten mixture may fail to properly wet or disperse within molten base resin. The lack of a full wet out as a result of the time and material release during the molding cycle, results in the conductive additives to form clumps, begin ganging, swirls, or what can be termed as hot spots within the resin as the materials have difficulty mixing. Further, these clumps, gangs, and swirls create voids within the polymer chains, resulting in weak spots and voids, constituting structural incompatibility destroying the base resins mechanical characteristics.

Another problem with prior art "salt and pepper" blending of concentrate pellets and pure resin-based pellets is chemical interaction that may occur between dissimilar materials. In particular, the carriers, or coatings, that bind together the conductive filler in the concentrate pellets can adversely chemically react with the base resin, creating unpredictable chemical and/or structural reactions that can lead to unpredictable and potentially very dangerous gassing, catastrophic failure and other damaging human and or equipment damaging circumstances. These material interactions are especially likely where the concentrate pellets are formed using two or more resin-based materials—a first material to bind the strands and a second material to form an outer coating or carrier. As a result, in a "salt and pepper" mix of concentrate and base resin pellets, a combination of three different resin-based materials is created. With over 15,000 commercially available base resins, it is important not to introduce resin-based materials into the concentrate carrier or outer coating that can react with any of the vast variety of pure engineered molding resins. In addition to unpredictable chemical reactions, is that different types of resin-based materials may exhibit different flow behaviors. It is found that "salt and pepper" blends result in electrically, thermally, mechanically, and acoustically inconsistent, unstable, structurally weakened, and/or poor quality molded articles and parts.

It is a primary objective of the present invention to provide a single, moldable capsule that does not require "salt and pepper" mixing, that does not introduce extraneous resin-based materials, that effectively time releases the conductive filler during mixing cycle during molding, and timely substantially homogenizes the conductive dopant within the base resin polymer matrix.

Several prior art inventions relate to conductive plastic materials, methods of manufacture, and articles of manufacture. For example, U.S. Pat. No. 5,397,608 and U.S. Pat. No. 4,664,971 to Soens each teach a process for manufacturing a plastic article containing electrically conductive fibers. The process taught comprises drawing a bundle of stainless steel filaments through a polyester solution, drying, impregnating (through extrusion) more of the same polyester, cutting into granules, dry mixing with thermoplastic pellets, extruding again, cutting again into pellets, dry mixing with pure plastic pellets, and molding the item. A fiber/plastic granule described has a conductive fiber content ranging from about 30% to 70% by volume (U.S. Pat. No. 5,397,608 to Soens, col. 4, lines 1-4). Based on typical resin specific gravity ranging between about 1.0 and 2.0 and typical stainless steel specific gravity of about 7.9, the above-cited volumetric-based range translates to between about 63% and 95% fiber content by weight for the granules. Additional sub-product versions of the fiber/plastic granules are described as having fiber content by weight of 93.8% (col. 6, lines 15-17), and having fiber content by weight of 87% (col. 6, lines 23-26), and having a fiber content by weight of 8% (col. 6, line 36). Molded articles are described having fiber content by weight of 4% (col. 7, line 20). This art teaches fiber/plastic granules with relatively high fiber content by weight (above 60%) that are mixed with a large amount of pure plastic prior to molding articles with relatively low fiber content by weight (less than 10%).

U.S. Pat. No. 4,788,104 to Adriaensen et al teaches the manufacture of a granular composite containing crimped stainless steel fiber for use in the injection molding of plastic articles with shielding properties against electromagnetic radiation. The process involves the steps of forming a granular composite of gear crimped stainless steel filaments embedded into a linear polyester resin and coated with a modified alkyd resin and chopped into granules. These granules are then dry mixed with another base resin granule and then extruded and chopped to form other granules that can be mixed with pure plastic to form articles. The granules are described as having fiber content by volume of between 20% and 80% (col. 3, lines 61-65). This content translates to fiber content by weight of between about 50% and about 97% based on typical resin specific gravity ranging between about 1.0 and 2.0 and typical stainless steel specific gravity of about 7.9. Exemplary articles manufactured from this material have a fiber content of about 10% by weight (col. 4, lines 49-52).

U.S. Pat. No. 6,455,143 B1 to Ishibashi et al teaches a fiber reinforced thermoplastic resin composition that has good flowability during the molding process and allows the fibers to be well dispersed in the molded product. This patent teaches the use of fibers having a high strength and elastic modulus such as carbon fibers, glass fibers, polyaramid fibers, alumina fibers, silicon carbide fibers or boron fibers for improving the mechanical properties of the molded product.

U.S. Patent Publication US 2003/0089892 A1 to Fox et al teaches an electrically conductive thermoplastic polymer composition which comprises a combination of metal fibers and metal-coated fibers. The metal-coated fibers taught in this invention are typically a non-metallic fiber such as a carbon, glass or a polymer core with a coating of silver, nickel, aluminum, chrome, tin, or lead.

U.S. Patent Publication US 2003/0111647 A1 to Rosenzweig teaches electrically conductive polymeric composites where the filler material is a combination of stainless steel that is plated with tin or a tin alloy. In this invention tin plated stainless steel fiber is cut into pellets which are then mixed with resin granules and extruded to form a conductive plastic article. The melting point of the resin is higher than that of the tin or tin alloy such that the tin plating melts during the molding operation to form conductive connections between stainless steel fibers in the final matrix. No content percentages are given.

U.S. Pat. No. 4,960,642 to Kosuga et al teaches a method of manufacturing pellets for making electromagnetic wave shielding material. In this invention, the pellets are formed by impregnating a metal fiber with a first polymer via a first extrusion process, coating the metal fiber with a desired base resin via a second extrusion process, and then cutting into a pellet form. This reference teaches against greater than 30% resin content by weight for the pellets (col. 3, lines 50-60) and teaches against forming pellets using a single step process of extruding resin directly onto the fibers (col. 6, lines 26-37, and TABLES 1 and 2).

U.S. Pat. No. 5,525,423 to Liberman et al teaches a method of manufacturing a fiber tow having fibers of plural diameters encapsulated within a polymeric material to form a two dimensional conductive layer. This invention teaches the encapsulation of the fiber tow thru extrusion and subsequently cutting the extruded composite material into plugs. The invention then teaches mixing the composite plugs with other plastics in an injection molding process to form EMI shielding items.

U.S. Pat. No. 6,305,922 B1 to Gates teaches an extrusion die apparatus for thermoplastic molding. U.S. Pat. No. 3,986,477 to Bigland teaches a wire coating apparatus used to coat metal wire with a thermoplastic material. U.S. Pat. No. 4,588,546 to Feil et al teaches a wire coating process and apparatus. U.S. Pat. No. 4,189,290 to Bassani teaches a wire coating process for liquid polymers. U.S. Pat. No. 6,669,986 B1 to Mushiake et al teaches a manufacturing method and apparatus for making multi-layer thermoplastic pellets.

SUMMARY OF THE INVENTION

A principle objective of the present invention is to provide an effective one part no mix moldable capsule useful for molding conductively doped resin-based articles or parts.

A further object of the present invention is to provide a moldable capsule exhibiting optimal properties for time releasing and substantially homogenizing of conductive dopants within a base resin during the stages of a molding cycle.

A further object of the present invention is to provide a one part moldable capsule having sufficient resin-based material such that salt and pepper mixing is not necessary.

A further object of the present invention is to provide a moldable capsule wherein an optimal ratio of conductive material and resin-based material is pre-formed into the moldable capsule.

A further object of the present invention is to provide a moldable capsule comprising various types of conductive dopants and various types of base resins.

A further object of the present invention is to provide a method to form a moldable capsule comprising conductively doped resin-based material.

A further object of the present invention is to provide a moldable capsule that is precision engineered and that is easily and predictably low cost manufactured.

A further object of the present invention is to provide a method to form a moldable capsule that is extendable to inclusion of more than one type of conductive doping materials into the capsule.

A further object of the present invention is to provide a method to manufacture articles from a moldable capsule comprising a conductively doped resin-based material.

A further object of the present invention is to provide a method to form a moldable capsule where it is not necessary to have an additional binding layer or binding material to bind the conductive filler material.

A further object of the present invention is to provide a moldable capsule where the conductive dopant is easily wetted during mixing and melting.

A further object of the present invention is to provide a moldable capsule where the conductive dopant is easily homogenized during the molding cycle.

A further object of the present invention is to provide a method to form a moldable capsule wherein the conductive dopant is easily inertly pre-treated to alter the filler particle chemical, mechanical, environmental, thermal, acoustical, or electrical qualities.

A further object of the present invention is to provide a method to form a moldable capsule wherein conductive dopant is added in a variety of means.

In accordance with the objects of this invention, a method to form a moldable capsule is achieved. The method comprises compressing a bundle of micron conductive fiber strands. A resin-based material is extruded onto the compressed bundle. The resin-based material and said bundle are sectioned into moldable capsules.

In accordance with the objects of this invention, a method to form a moldable capsule is achieved. The method comprises compressing a bundle of micron conductive fiber strands. A resin-based material is extruded onto the compressed bundle. The resin-based material and the bundle are sectioned into moldable capsules. The micron conductive fiber comprises between about 20% and about 50% of the total weight of each moldable capsule.

In accordance with the objects of this invention, a method to form a moldable capsule is achieved. The method comprises compressing a bundle of micron conductive fiber strands by pulling the bundle through a compressing ring. A resin-based material is extruded onto the compressed bundle. The resin-based material and the bundle are sectioned into moldable capsules. The micron conductive fiber comprises between about 20% and about 50% of the total weight of each moldable capsule.

BRIEF DESCRIPTION OF THE DRAWINGS

In the accompanying drawings forming a material part of this description, there is shown:

FIGS. 5a and 5b illustrate a fourth preferred embodiment wherein conductive fabric-like materials are formed from the conductively doped resin-based material.

FIGS. 6a and 6b illustrate, in simplified schematic form, an injection molding apparatus and an extrusion molding apparatus that may be used to mold articles of a conductively doped resin-based material.

DESCRIPTION OF THE PREFERRED EMBODIMENTS

Figure 1:
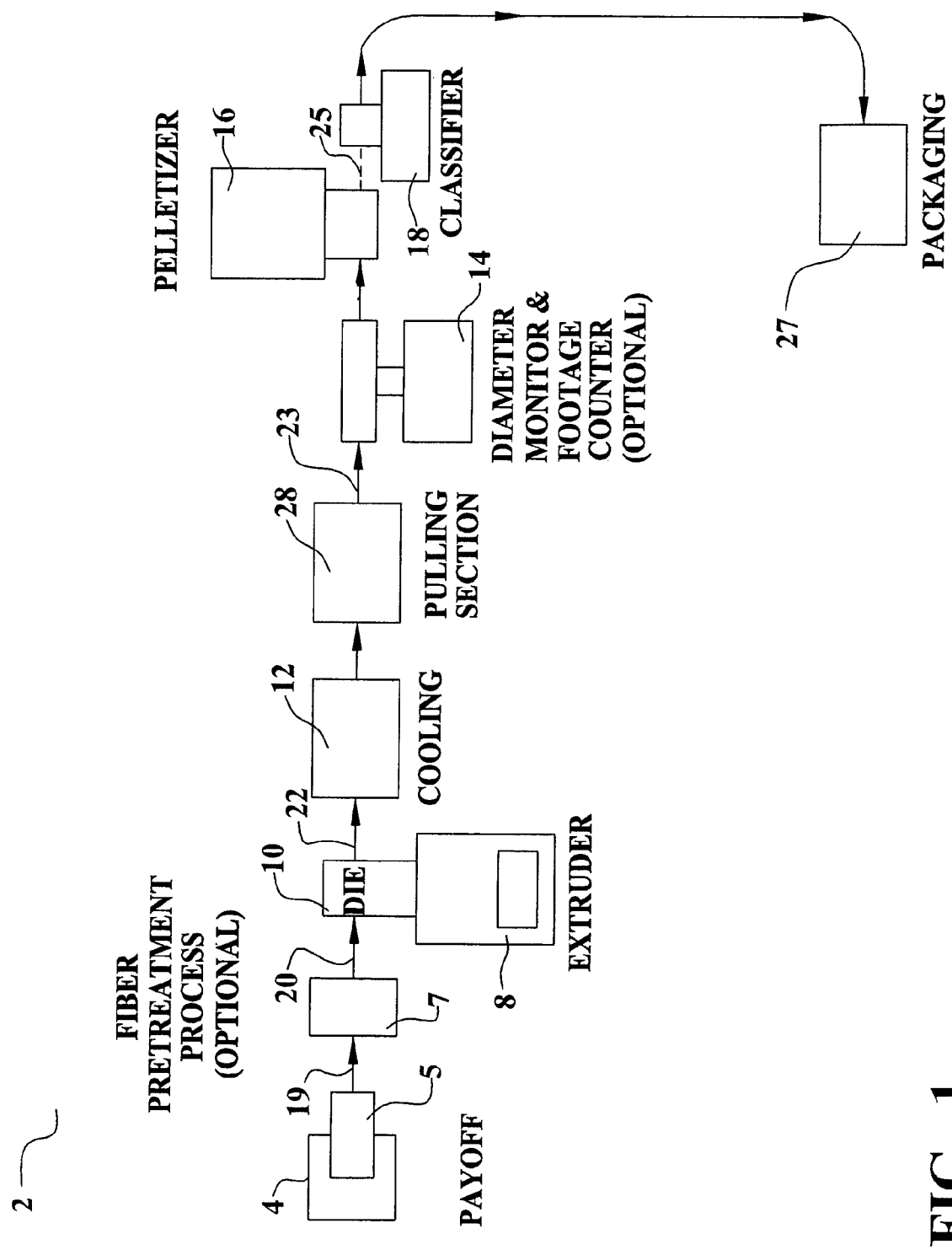
FIG. 1 illustrates a first preferred embodiment of the present invention showing a method to manufacture a moldable capsule.

The present invention relates to conductively doped resin-based materials comprising micron conductive powders, micron conductive fibers, or a combination thereof, substantially homogenized within a base resin when molded. More particularly, the present invention relates to moldable capsules comprising a conductively doped material and a resin-based material that are useful in the manufacture of articles of conductively doped resin-based materials.

The conductively doped resin-based materials of the invention are base resins doped, with conductive materials, which then transforms any base resin into a conductor rather than an insulator. The resins provide the structural integrity to the molded part. The micron conductive fibers, micron conductive powders, or a combination thereof, are substantially homogenized within the base resin during the molding process, providing the electrical, thermal, and acoustical continuity.

The conductively doped resin-based materials can be molded, extruded or the like to provide almost any desired shape or size. The molded conductively doped resin-based materials can also be cut, stamped, or vacuumed formed from an injection molded or extruded sheet or bar stock, overmolded, laminated, milled, or the like, to provide the desired shape and size. The thermal, electrical, and acoustical continuity and or conductivity characteristics of articles or parts fabricated using conductively doped resin-based materials depends on the composition of the conductively doped resin-based materials, of which the doping parameters and or materials can be adjusted, to aid in achieving the desired structural, electrical or other physical characteristics of the then molded material. The selected materials used to fabricate the articles are substantially homogenized together using molding techniques and or methods such as injection molding, over-molding, insert molding, compression molding, thermo-set, protrusion, extrusion, calendaring, or the like. Characteristics related to 2D, 3D, 4D, and 5D designs, molding and electrical characteristics, include the physical and electrical advantages that can be achieved during the molding process of the actual parts and the molecular polymer physics associated within the conductive networks within the molded part(s) or formed material(s).

In the conductively doped resin-based material, electrons travel from point to point, following the path of least resistance. Most resin-based materials are insulators and represent a high resistance to electron passage. The doping within the resin-based material alters the inherent resistance of the polymers. At a threshold concentration of conductively doping, the resistance through the combined mass is lowered enough to allow electrons movement. Speed of electron movement depends on conductive doping concentration and the materials chemical make up, that is, the separation between the conductive doping particles. Increasing conductive doping content reduces interparticle separation distance, and, at a critical distance known as the percolation point, resistance decreases dramatically and free electrons move rapidly.

Resistivity is a material property that depends on the atomic bonding of the microstructure of the material. The atomic microstructure material properties within the conductively doped resin-based material are altered when molded into a structure. A substantially homogenized conductive microstructure of delocalized valance electrons is created within the valance and conduction bands of the said molecules. This microstructure provides sufficient charge carriers within the molded matrix structure. As a result, a low density, low resistivity, lightweight, durable, resin based polymer microstructure material is achieved. This material can exhibit conductivity comparable to that of highly conductive metals such as silver, copper or aluminum, while maintaining the superior structural characteristics found in many plastics and rubbers or other structural resin based materials.

The use of conductively doped resin-based materials in the fabrication of articles and parts significantly lowers the cost of materials and the design and manufacturing processes used to hold ease of close tolerances, by forming these materials into desired shapes and sizes. The articles can be manufactured into infinite shapes and sizes using conventional forming and molding methods such as injection molding, over-molding, compression molding, thermoset molding, or extrusion, calendaring, or the like. The conductively doped resin-based materials, when molded, typically but not exclusively produce a desirable usable range of resistivity of less than about 5 to more than about 25 ohms per square, but other resistivities can be achieved by varying the dopants, doping parameters, and/or base resin selection(s).

The conductively doped resin-based materials comprise micron conductive powders, micron conductive fibers, or any combination thereof, which are substantially homogenized together within the base resin, during the molding process, yielding an easy to produce low cost, electrical, thermal, and acoustical performing, close tolerance manufactured part or circuit. The resulting molded article comprises a three dimensional, continuous capillary network of conductive doping particles contained and or bonding within the polymer matrix. Exemplary micron conductive powders include carbons, graphites, amines, eeonomers, or the like, and/or of metal powders such as nickel, copper, silver, aluminum, nichrome, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. Carbon nano-tubes may be added to the conductively doped resin-based material. The addition of conductive powder to the micron conductive fiber doping may improve the electrical continuity on the surface of the molded part to offset any skinning effect that occurs during molding.

The micron conductive fibers may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, melamine, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

Where micron fiber is combined with base resin, the micron fiber may be pretreated to improve performance. According to one embodiment of the present invention, conductive or non-conductive powders are leached into the fibers prior to extrusion. In other embodiments, the fibers are subjected to any or several chemical modifications in order to improve the fibers interfacial properties. Fiber modification processes include, but are not limited to: chemically inert coupling agents; gas plasma treatment; anodizing; mercerization; peroxide treatment; benzoylation; or other chemical or polymer treatments.

Chemically inert coupling agents are materials that are molecularly bonded onto the surface of metal and or other fibers to provide surface coupling, mechanical interlocking, inter-diffusion and adsorption and surface reaction for later bonding and wetting within the resin-based material. This chemically inert coupling agent does not react with the resin-based material. An exemplary chemically inert coupling agent is silane. In a silane treatment, silicon-based molecules from the silane bond to the surface of metal fibers to form a silicon layer. The silicon layer bonds well with the subsequently extruded resin-based material yet does not react with the resin-based material. As an additional feature during a silane treatment, oxane bonds with any water molecules on the fiber surface to thereby eliminate water from the fiber strands. Silane, amino, and silane-amino are three exemplary pre-extrusion treatments for forming chemically inert coupling agents on the fiber.

In a gas plasma treatment, the surfaces of the metal fibers are etched at atomic depths to re-engineer the surface. Cold temperature gas plasma sources, such as oxygen and ammonia, are useful for performing a surface etch prior to extrusion. In one embodiment of the present invention, gas plasma treatment is first performed to etch the surfaces of the fiber strands. A silane bath coating is then performed to form a chemically inert silicon-based film onto the fiber strands. In another embodiment, metal fiber is anodized to form a metal oxide over the fiber. The fiber modification processes described herein are useful for improving interfacial adhesion, improving wetting during homogenization, and/or reducing oxide growth (when compared to non-treated fiber). Pretreatment fiber modification also reduces levels of particle dust, fines, and fiber release during subsequent capsule sectioning, cutting or vacuum line feeding.

The resin-based structural material may be any polymer resin or combination of compatible polymer resins. Non-conductive resins or inherently conductive resins may be used as the structural material. Conjugated polymer resins, complex polymer resins, and/or inherently conductive resins may be used as the structural material. The dielectric properties of the resin-based material will have a direct effect upon the final electrical performance of the conductively doped resin-based material. Many different dielectric properties are possible depending on the chemical makeup and/or arrangement, such as linking, cross-linking or the like, of the polymer, co-polymer, monomer, ter-polymer, or homo-polymer material. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material doped with micron conductive powders, micron conductive fibers, or in combination thereof can be molded, using conventional molding methods such as injection molding or over-molding, or extrusion to create desired shapes and sizes. The molded conductively doped resin-based materials can also be stamped, cut or milled as desired to form create the desired shapes and form factor(s). The doping composition and directionality associated with the micron conductors within the doped base resins can affect the electrical and structural characteristics of the articles and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as TEFLON, Polyesters, or any resin-based flexible or solid material(s), which when discretely designed in fiber content(s), orientation(s) and shape(s), will produce a very highly conductive flexible cloth-like material. Such a cloth-like material could also be used in forming articles that could be embedded in a person's clothing as well as other resin materials such as rubber(s) or plastic(s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping, a combination of micron conductive fiber and micron conductive powder.

The conductively doped resin-based material may also be formed into a prepreg laminate, cloth, or webbing. A laminate, cloth, or webbing of the conductively doped resin-based material is first homogenized with a resin-based material. In various embodiments, the conductively doped resin-based material is dipped, coated, sprayed, and/or extruded with resin-based material to cause the laminate, cloth, or webbing to adhere together in a prepreg grouping that is easy to handle. This prepreg is placed, or laid up, onto a form and is then heated to form a permanent bond. In another embodiment, the prepreg is laid up onto the impregnating resin while the resin is still wet and is then cured by heating or other means. In another embodiment, the wet lay-up is performed by laminating the conductively doped resin-based prepreg over a honeycomb structure. In another embodiment, the honeycomb structure is made from conductively doped, resin-based material. In yet another embodiment, a wet prepreg is formed by spraying, dipping, or coating the conductively doped resin-based material laminate, cloth, or webbing in high temperature capable paint.

Prior art carbon fiber and resin-based composites are found to display unpredictable points of failure. In carbon fiber systems there is little if any elongation of the structure. By comparison, in the present invention, the conductively doped resin-based material, even if formed with carbon fiber or metal plated carbon fiber, displays greater strength of the mechanical structure due to the substantial homogenization of the fiber created by the moldable capsules. As a result a structure formed of the conductively doped resin-based material of the present invention will maintain structurally even if crushed while a comparable carbon fiber composite will break into pieces.

The conductively doped resin-based material of the present invention can be made resistant to corrosion and/or metal electrolysis by selecting micron conductive fiber and/or micron conductive powder dopants and base resins that are resistant to corrosion and/or metal electrolysis. For example, if a corrosion/electrolysis resistant base resin is combined with fibers/powders or in combination of such as stainless steel fiber, inert chemical treated coupling agent warding against corrosive fibers such as copper, silver and gold and or carbon fibers/powders, then corrosion and/or metal electrolysis resistant conductively doped resin-based material is achieved. Another additional and important feature of the present invention is that the conductively doped resin-based material of the present invention may be made flame retardant. Selection of a flame-retardant (FR) base resin material allows the resulting product to exhibit flame retardant capability. This is especially important in applications as described herein.

The substantially homogeneous mixing of micron conductive fiber and/or micron conductive powder and base resin described in the present invention may also be described as doping. That is, the substantially homogeneous mixing transforms a typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the substantially homogeneous mixing of micron conductive fiber and/or micron conductive powder within a base resin.

As an additional and important feature of the present invention, the molded conductor doped resin-based material exhibits excellent thermal dissipation characteristics. Therefore, articles manufactured from the molded conductor doped resin-based material can provide added thermal dissipation capabilities to the application. For example, heat can be dissipated from electrical devices physically and/or electrically connected to an article of the present invention.

As a significant advantage of the present invention, articles constructed of the conductively doped resin-based material can be easily interfaced to an electrical circuit or grounded. In one embodiment, a wire can be attached to conductively doped resin-based articles via a screw that is fastened to the article. For example, a simple sheet-metal type, self tapping screw can, when fastened to the material, can achieve excellent electrical connectivity via the conductive matrix of the conductively doped resin-based material. To facilitate this approach a boss may be molded as part of the conductively doped resin-based material to accommodate such a screw. Alternatively, if a solderable screw material, such as copper, is used, then a wire can be soldered to the screw is embedded into the conductively doped resin-based material. In another embodiment, the conductively doped resin-based material is partly or completely plated with a metal layer. The metal layer forms excellent electrical conductivity with the conductive matrix. A connection of this metal layer to another circuit or to ground is then made. For example, if the metal layer is solderable, then a soldered connection may be made between the article and a grounding wire.

Where a metal layer is formed over the surface of the conductively doped resin-based material, any of several techniques may be used to form this metal layer. This metal layer may be used for visual enhancement of the molded conductively doped resin-based material article or to otherwise alter performance properties. Well-known techniques, such as electroless metal plating, electro plating, electrolytic metal plating, sputtering, metal vapor deposition, metallic painting, or the like, may be applied to the formation of this metal layer. If metal plating is used, then the resin-based structural material of the conductively doped, resin-based material is one that can be metal plated. There are many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. Electroless plating is typically a multiple-stage chemical process where, for example, a thin copper layer is first deposited to form a conductive layer. This conductive layer is then used as an electrode for the subsequent plating of a thicker metal layer.

A typical metal deposition process for forming a metal layer onto the conductively doped resin-based material is vacuum metallization. Vacuum metallization is the process where a metal layer, such as aluminum, is deposited on the conductively doped resin-based material inside a vacuum chamber. In a metallic painting process, metal particles, such as silver, copper, or nickel, or the like, are dispersed in an acrylic, vinyl, epoxy, or urethane binder. Most resin-based materials accept and hold paint well, and automatic spraying systems apply coating with consistency. In addition, the excellent conductivity of the conductively doped resin-based material of the present invention facilitates the use of extremely efficient, electrostatic painting techniques.

The conductively doped resin-based materials can be contacted in any of several ways. In one embodiment, a pin is embedded into the conductively doped resin-based material by insert molding, ultrasonic welding, pressing, or other means. A connection with a metal wire can easily be made to this pin and results in excellent contact to the conductively doped resin-based material conductive matrix. In another embodiment, a hole is formed in to the conductively doped resin-based material either during the molding process or by a subsequent process step such as drilling, punching, or the like. A pin is then placed into the hole and is then ultrasonically welded to form a permanent mechanical and electrical contact. In yet another embodiment, a pin or a wire is soldered to the conductively doped resin-based material. In this case, a hole is formed in the conductively doped resin-based material either during the molding operation or by drilling, stamping, punching, or the like. A solderable layer is then formed in the hole. The solderable layer is preferably formed by metal plating. A conductor is placed into the hole and then mechanically and electrically bonded by point, wave, or reflow soldered.

Another method to provide connectivity to the conductively doped resin-based material is through the application of a solderable ink film to the surface. One exemplary solderable ink is a combination of copper and solder particles in an epoxy resin binder. The resulting mixture is an active, screen-printable and dispensable material. During curing, the solder reflows to coat and to connect the copper particles and to thereby form a cured surface that is directly solderable without the need for additional plating or other processing steps. Any solderable material may then be mechanically and/or electrically attached, via soldering, to the conductively doped resin-based material at the location of the applied solderable ink. Many other types of solderable inks can be used to provide this solderable surface onto the conductively doped resin-based material of the present invention. Another exemplary embodiment of a solderable ink is a mixture of one or more metal powder systems with a reactive organic medium. This type of ink material is converted to solderable pure metal during a low temperature cure without any organic binders or alloying elements.

A ferromagnetic conductively doped resin-based material may be formed of the present invention to create a magnetic or magnetizable form of the material. Ferromagnetic micron conductive fibers and/or ferromagnetic conductive powders are substantially homogenized with the base resin. Ferrite materials and/or rare earth magnetic materials are added as a conductive doping to the base resin. With the substantially homogeneous mixing of the ferromagnetic micron conductive fibers and/or micron conductive powders, the ferromagnetic conductively doped resin-based material is able to produce an excellent low cost, low weight, high aspect ratio magnetize-able item. The magnets and magnetic devices of the present invention can be magnetized during or after the molding process. Adjusting the doping levels and or dopants of ferromagnetic micron conductive fibers and/or ferromagnetic micron conductive powders that are homogenized within the base resin can control the magnetic strength of the magnets and magnetic devices. By increasing the aspect ratio of the ferromagnetic doping, the strength of the magnet or magnetic devices can be substantially increased. The substantially homogenous mixing of the conductive fibers/powders or in combinations there of allows for a substantial amount of dopants to be added to the base resin without causing the structural integrity of the item to decline mechanically. The ferromagnetic conductively doped resin-based magnets display outstanding physical properties of the base resin, including flexibility, moldability, strength, and resistance to environmental corrosion, along with superior magnetic ability. In addition, the unique ferromagnetic conductively doped resin-based material facilitates formation of items that exhibit superior thermal and electrical conductivity as well as magnetism.

A high aspect ratio magnet is easily achieved through the use of ferromagnetic conductive micron fiber or through the combination of ferromagnetic micron powder with conductive micron fiber. The use of micron conductive fiber allows for molding articles with a high aspect ratio of conductive fibers/powders or combinations there of in a cross sectional area. If a ferromagnetic micron fiber is used, then this high aspect ratio translates into a high quality magnetic article. Alternatively, if a ferromagnetic micron powder is combined with micron conductive fiber, then the magnetic effect of the powder is effectively spread throughout the molded article via the network of conductive fiber such that an effective high aspect ratio molded magnetic article is achieved. The ferromagnetic conductively doped resin-based material may be magnetized, after molding, by exposing the molded article to a strong magnetic field. Alternatively, a strong magnetic field may be used to magnetize the ferromagnetic conductively doped resin-based material during the molding process.

The ferromagnetic conductively doped is in the form of fiber, powder, or a combination of fiber and powder. The micron conductive powder may be metal fiber or metal plated fiber or powders. If metal plated fiber is used, then the core fiber is a platable material and may be metal or non-metal. Exemplary ferromagnetic conductive fiber materials include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive fiber materials. Exemplary ferromagnetic micron powder leached onto the conductive fibers include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive powder materials. A ferromagnetic conductive doping may be combined with a non-ferromagnetic conductive doping to form a conductively doped resin-based material that combines excellent conductive qualities with magnetic capabilities.

Referring now to FIG. 1, a first preferred embodiment of the present invention is illustrated. A schematic 2 shows a manufacturing flow for forming a unique, moldable capsule via the present invention. In this method, an extrusion/pultrusion process is used to extrude a base resin onto a continuous conductive micron fiber bundle. After extrusion/pultrusion, the combined fiber and resin cable is pelletized into moldable capsules.

In the illustrated embodiment, a reel of micron conductive fiber 5 is loaded onto a payoff apparatus 4. The micron conductive fiber 19 preferably comprises multiple, parallel strands of micron conductive fiber. Each strand of micron conductive fiber is preferably in the range of between about 6 and about 12 microns in diameter. The bundle 19 preferably comprises up to tens of thousands of strands of fiber.

The micron conductive fiber bundle 19 is routed into the extrusion die 10. In some embodiments of the process, however, it is useful to pre-process the fiber bundle 19 prior to extrusion. A pretreatment process 7, or combination of processes, is performed to enhance the characteristics of the fiber bundle 19 prior to extrusion. Pretreatment processes include, but are not limited, leaching processes that add materials to the bundle and chemical modification processes that improve the fibers interfacial properties.

In one embodiment of a teaching pretreatment process 7, the micron conductive fiber 19 from the payoff reel 5 is first routed into a powdering apparatus 7 prior to routing into the extrusion apparatus 8 and 10. The powdering apparatus 7 preferably comprises a solution comprising micron conductive powder suspended in a liquid media. As the fiber bundle 19 is fed through the liquid media, the micron conductive powder in the solution leaches into the micron conductive fiber 19. The resulting treated fiber bundle 20 is thereby impregnated with micron conductive powder.

There are several embodiments of inert chemical modification processes that improve the fibers interfacial properties. Treatments include, but are not limited to, chemically inert coupling agents, gas plasma, anodizing, mercerization, peroxide treatment, benzoylation, and other chemical or polymer treatments. A chemically inert coupling agent is a material that is bonded onto the surface of metal fiber to provide an excellent coupling surface for later bonding with the resin-based material. This chemically inert coupling agent does not react with the resin-based material. An exemplary chemically inert coupling agent is silane. In a silane treatment, silicon-based molecules from the silane molecularly bond to the surface of metal fibers to form a silicon layer. The silicon layer bonds well with the subsequently extruded resin-based material yet is chemically inert with respect to resin-based materials. The unpredictable and damaging chemical interactions exhibited in the prior art "salt and pepper" mix are thereby avoided. As an optional feature during a silane treatment, oxane bonds with any water molecules on the fiber surface to thereby eliminate water from the fiber strands. Silane, amino, and silane-amino are three exemplary pre-extrusion treatments for forming chemically inert coupling agents on the fiber.

In a gas plasma treatment, the surfaces of the metal fibers are etched at atomic depths to re-engineer the surface. Cold temperature gas plasma sources, such as oxygen and ammonia, are useful for performing a surface etch prior to extrusion. In one embodiment of the present invention, gas plasma treatment is first performed to etch the surfaces of the fiber strands. A silane bath coating is then performed to form a chemically inert silicon-based film onto the fiber strands. In another embodiment, metal fiber is anodized to form a metal oxide over the fiber. The fiber modification processes described herein are useful for improving interfacial adhesion, improving wetting during homogenization, and/or reducing and preventing oxide growth (when compared to non-treated fiber). Pretreatment fiber modification may also reduce levels of dust, fines, and fiber release during subsequent pellet cutting or vacuum fed feeders. After the optional pretreatment, the treated micron fiber bundle 20 is routed into the extruder die 10.

Figure 9:
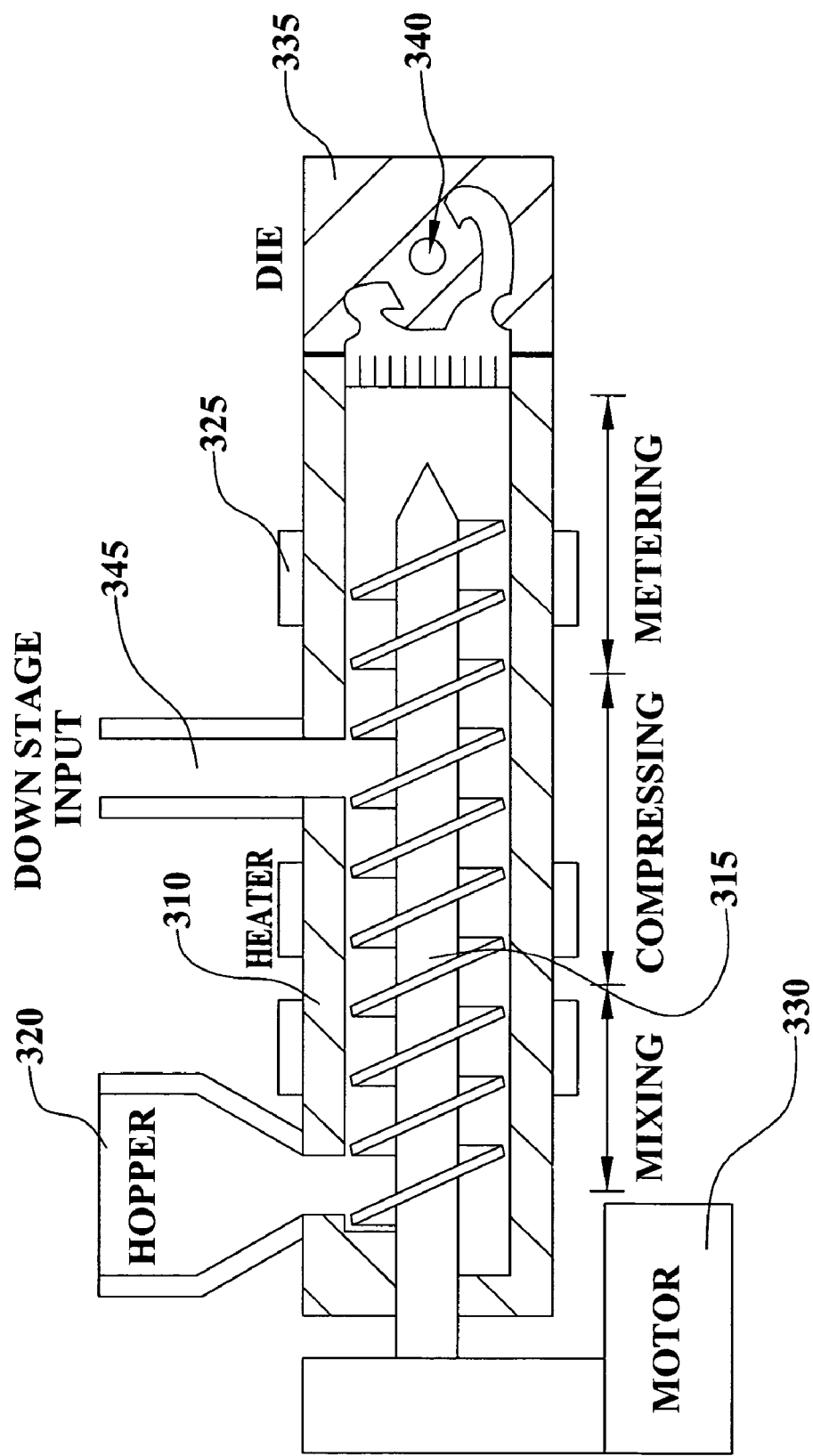
FIG. 9 illustrates a fourth preferred embodiment of the present invention showing an extruder system for forming the moldable capsule.

The extruder 8 and 10 is used to form resin-based material onto the fiber bundle 20. Several important features of the extruder 8 and 10 are described herein. Referring now to FIG. 9, a fourth preferred embodiment of the present invention is illustrated showing an extrusion machine, or extruder. The extruder comprises a hopper unit 320. Resin-based molding material is loaded into the hopper unit 320. In one preferred embodiment, the resin-based molding material comprises pure resin-based material in the form of pellets, sheets, rods, or lumps. In other preferred embodiments, various additives, lubricants, colorants, plasticizers, and other materials typical to the art of plastic molding are added to the resin-based material in the hopper 320. In yet other preferred embodiments, micron conductive powders and/or fibers are added to the resin-based material in the hopper 320. In other preferred embodiments, a pre-compounded resin-based material, where the resin-based material is pre-mixed with a combination of additives, lubricants, colorants, plasticizers, conductive powders and fibers, is loaded into the hopper 320. In another preferred embodiment of the present invention, the resin-based hopper load is constantly fed at a rate to sustain high-volume extrusion of resin-based material onto the continuous fiber bundle 20. Any of a number of known material conveyances may be used, such as gravity feeders, vibratory feeders, and the like.

The hopper 320 feeds the resin-based material into a barrel 310 and screw 315 mechanism. The screw 315 is essentially a large auger that fits closely inside of the barrel 310. A motor 330 turns the screw 315 inside the barrel chamber 310 to create a combination material feeding, heating, and mixing effect. The barrel 310 is heated by this turning friction and by heaters 325 that are distributed around the barrel 310. The screw 315 and barrel 310 mechanism conveys the resin-based material away from the hopper 320 and toward the mold 335. In the mixing section of the screw 315 and barrel 310, the primarily actions are mixing and heating of the resin-based material. Melting begins to occur but without compression. In the subsequent compression section, the resin-based material is completely melted. Compression of the molten blend begins. In the subsequent metering section, the final mixing and homogenization of the resin-based material and all additives, lubricants, colorants, plasticizers, conductive fillers, and the like, is completed to generate physically homogenized material. The resin-based material is then forced through a crosshead die 335. In the crosshead die 335, the resin-based material converges on the micron fiber bundle 20. The micron conductive fiber bundle 20 is routed through the hollow core or ring 340 of the die 335 such that molten resin-based material surrounds the bundle and is extruded onto the bundle as the bundle passes through.

Figure 10:
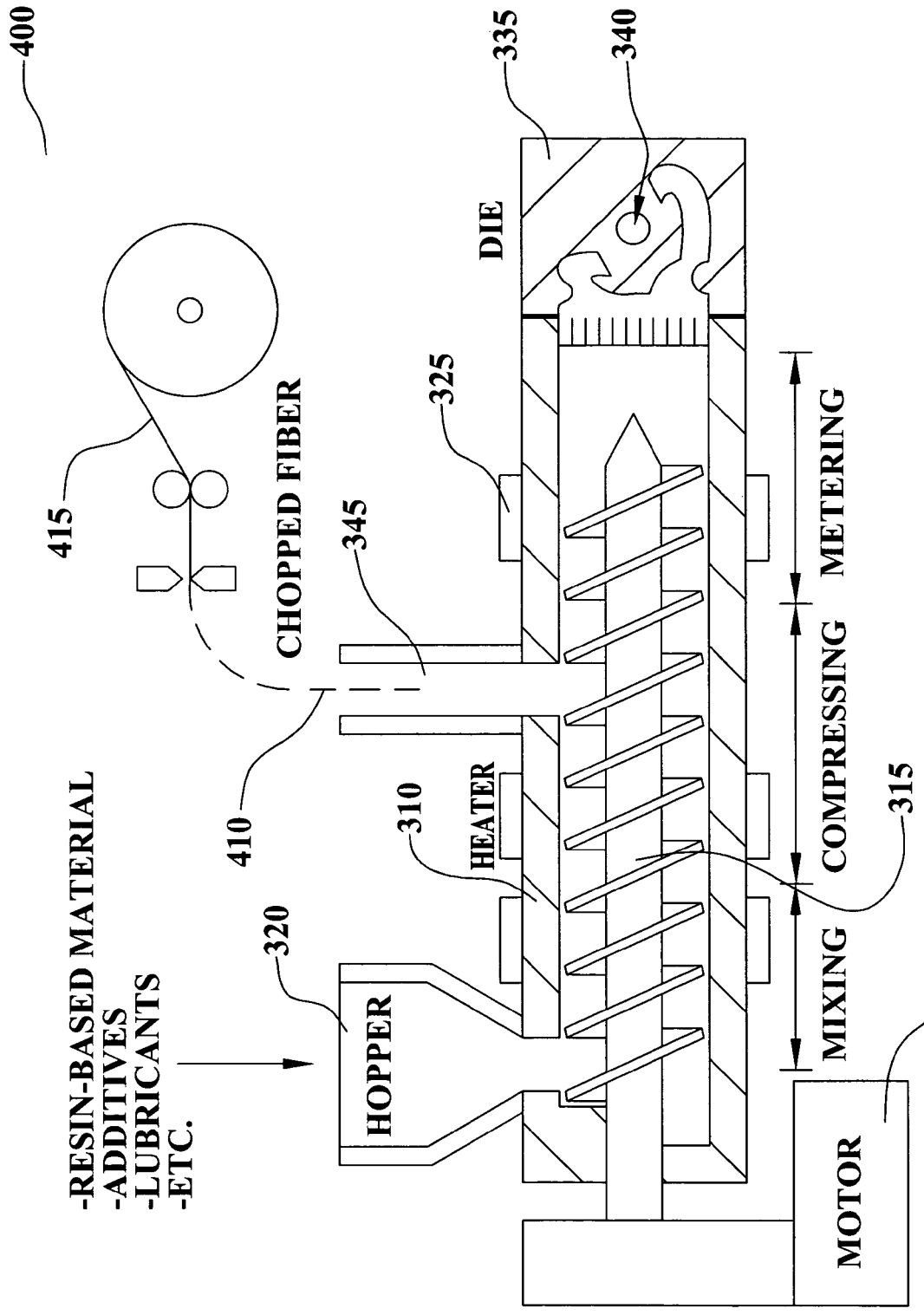
FIG. 10 illustrates a fifth preferred embodiment of the present invention showing an extruder system for forming the moldable capsule where chopped fiber is added to the resin-based extrusion material.

An optional down stage input 345 is shown on the extruder barrel 310. This additional material input is useful for adding components to the resin-based material after the main mixing and compressing sections of the barrel 310. Referring now to FIG. 10, a fifth preferred embodiment 400 of the present invention illustrates an embodiment where the down stage input is used. In this embodiment, the resin-based material is loaded into the hopper 320 as before. In this case, however, chopped micron conductive fiber 410 is added through the down stage input 345 to the resin-based material moving through the screw 315 and barrel 310. In the preferred embodiment, a micron conductive fiber bundle 415, similar to that described for the main micron fiber bundle, is unwound from a spool and then chopped into specified lengths. The chopped fiber 410 becomes part of the resin-based material that is routed into the crosshead die 335. It may be preferable to add chopped micron fiber, or other similar components, to the resin-based material in the screw 315 and barrel 310 after the primary mixing and compression stages to thereby minimize fiber damage due to mixing and compressing forces. In this embodiment, the chopped fiber 410 is added by gravity feed. This approach is well suited to adding conductive fiber such as metal or metal plated fiber to the moldable mixture.

Figure 11:
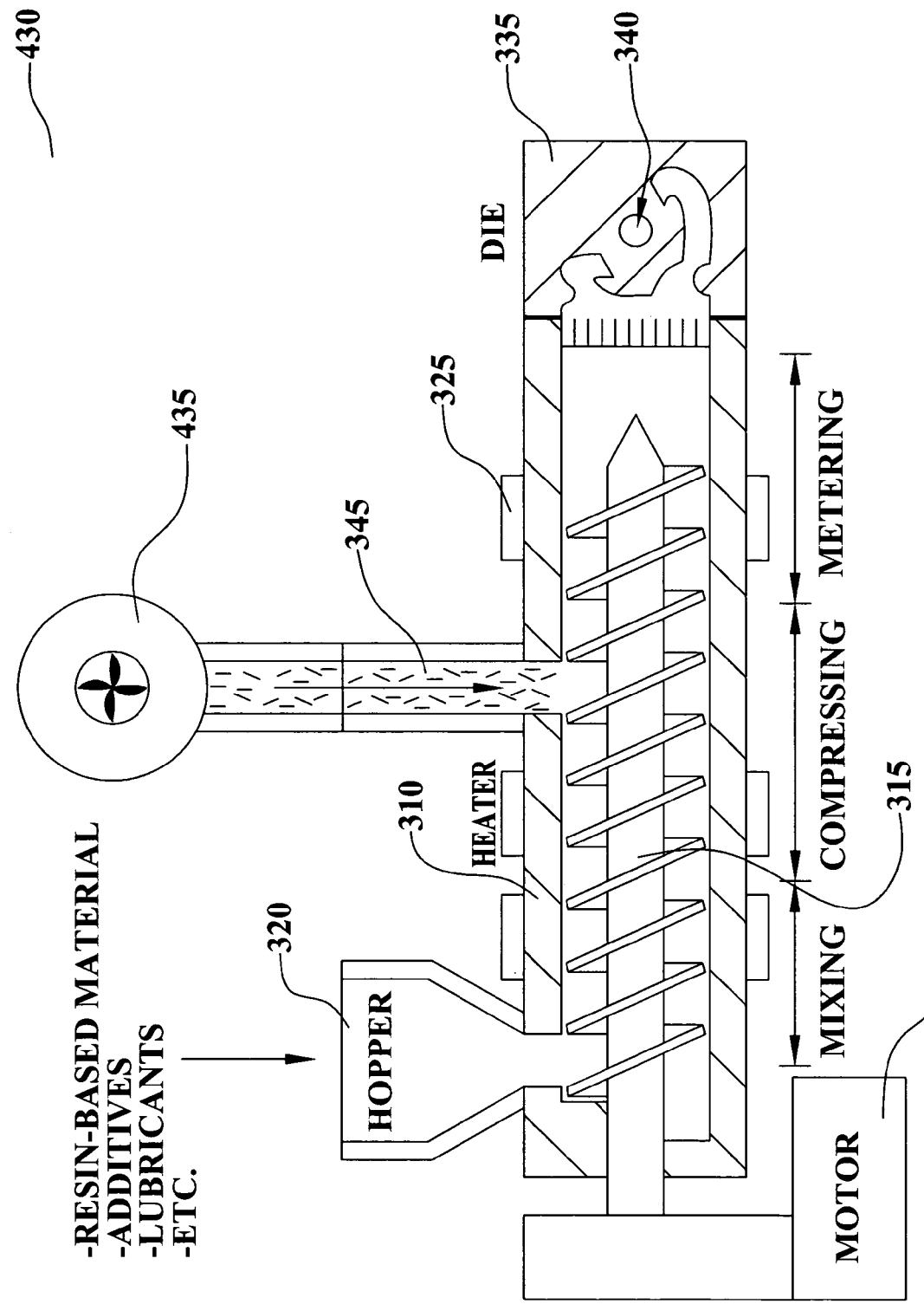
FIG. 11 illustrates a sixth preferred embodiment of the present invention showing an extruder system for forming the moldable capsule where fiber is blown into the resin-based extrusion material.

Referring now to FIG. 11, a sixth preferred embodiment 430 of the present invention shows another method to load fiber through the downstage input. In this embodiment, chopped fiber is blown into the screw 315 and barrel 310 mechanism through the down stage input 345 via a blowing or gun mechanism 435. This approach is well suited for loading fibers into the resin-based material. Again, by delaying the introduction of fibers until after primary mixing and compression, fiber damage is minimized.

In another preferred embodiment of the present invention, a twin screw extruder is used. A twin-screw extruder has two screws that are arranged side-by-side and rotate in an intermeshing pattern that typically looks like a "FIG. 8" in end view. The intermeshing action of the two screws constantly self-wipes the screw flights or inner barrel surfaces. A single screw extruder may exhibit difficulty with resin-based material adhering to the barrel sidewalls or flaking. However, a twin-screw extruder forces the resin-based material to follow the figure eight pattern and thereby generates a positive pumping action for all forms of resin-based material. As a result, a twin screw extruder is typically capable of operating at faster extrusion rates than a single screw extruder.

Figure 7:
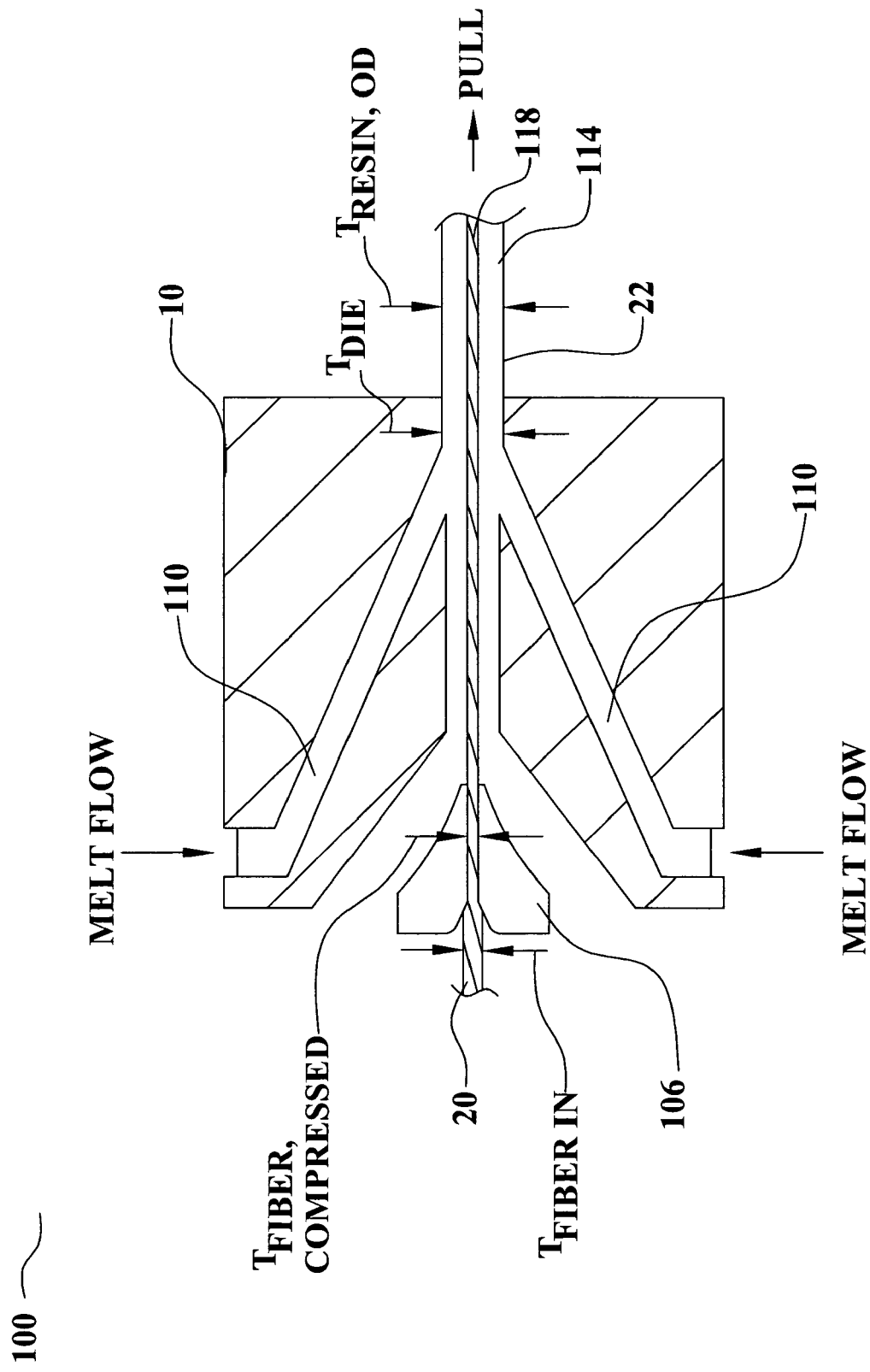
FIG. 7 illustrates a second preferred embodiment of the present invention showing a crosshead extrusion die of the present invention.

Referring now to FIG. 7, a preferred embodiment of a crosshead die 10 of the present invention is illustrated in cross-sectional view. Several important features of the crosshead die and the method of extruding should be noted. An opening is made through the die 10 to allow the micron fiber bundle 20 to pass through. The bundle 20 passes routing channels containing the melted resin-based material 110.

The incoming fiber bundle 20 has a relatively thick diameter $T_{FIBER,IN}$. Although each fiber strand is aligned in parallel, there are air gaps between the strands. Prior to entering the crosshead die 10, the bundle 20 passes through a compression ring 106. The compression ring 106 progressively forces the fiber strands together and puts a compression force on the collective bundle. As a result, the outer diameter is reduced to $T_{FIBER,COMPRESSED}$ as the compressed bundle 118 exits the compression ring 106.

By incorporating the novel step of compressing the fiber bundle 20, prior to extrusion coating with the molten resin-based material, several advantages are derived. First, the compression introduces an initial force onto the compressed bundle 118. After the resin-based material coats onto the compressed bundle 118, the fiber strands mechanically rebound against the extruded resin-based material 114. This compression rebounding effectively locks together the fiber bundle 118 and the extruded resin-based material 114 in to what is herein called an extruded bundle 22. The compression/rebound effect is particularly important where a fiber material is selected that does not chemically bond well with the selected resin-based material. Second, during subsequent cutting, or pelletizing, of the extruded bundle, the compressed fiber 118 will be well-retained, or locked, in the extruded resin-based material 114. The fiber is also locked into the resin-based material during subsequent handling of the palletized, moldable capsules. This fiber retention mechanism is accomplished without coating the fiber bundle with a different resin-based material prior to extrusion. Therefore, additional processing expense is avoided and, more importantly, adverse interactions of dissimilar resin-based materials, as described in the prior art, are avoided. As an important additional advantage, it is found the moldable capsule formed using this pre-compressing process exhibits excellent fiber release during molding operations.

A controlled diameter of extruded resin-based material 114 is extruded onto the compressed bundle 118. The resulting extruded cable diameter TRESIN,OD is determined by the diameter of the die opening TDIE. By controlling the extruded cable diameter TRESIN,OD, a specified amount of extruded resin-based material 114 is extruded onto the compressed bundle 118. As a result, the percent, by weight, of the micron conductive fiber 118 in the resulting extruded cable 22 is carefully controlled. More particularly, in one embodiment, the micron conductive fiber core 118 comprises between about 20% and about 50% of the total weight of the wire-like cable 22. In a more preferred embodiment, the micron conductive fiber core 118 comprises between about 20% and about 40% of the total weight of the wire-like cable 22. In a yet more preferred embodiment, the micron conductive fiber core 118 comprises between about 25% and about 35% of the total weight of the wire-like cable 22. In a yet more preferred embodiment, the micron conductive fiber core 118 comprises between about 30% of the total weight of the wire-like cable 22.

In another preferred embodiment of the present invention, the conductive doping is determined by volume percentage. In a most preferred embodiment, the conductive doping comprises a volume of between about 4% and about 10% of the total volume of the conductively doped resin-based material. In a less preferred embodiment, the conductively doping comprises a volume of between about 1% and about 50% of the total volume of the conductively doped resin-based material though the properties of the base resin may be impacted by high percent volume doping.

The novel extrusion/pultrusion process produces a continuous extruded bundle 22 comprising a micron fiber bundle 118 with a resin-based material 114 extruded thereon. In one embodiment, the micron fiber bundle 118 further comprises embedded micron conductive powder that is leached into the bundle 118 prior to extrusion. In another embodiment, the micron fiber bundle 118 further comprises a chemically inert coupling agent to aid in bonding between fiber and resin-based material. In another embodiment, the micron fiber bundle has been anodized to prevent further oxidation effects on the fiber surface. In another embodiment, the micron fiber bundle has been etched to improve surface adhesion between fiber and resin-material. In another embodiment, the resin-based material further comprises conductive doping, such as micron conductive fiber or powder, such that the extruded bundle carries conductive doping both in the core bundle 118 and in the extruded resin-based material 114.

Referring again to FIG. 1, the extruded bundle 22 passes through a cooling process 12. The cooling process 12 reduces the temperature of the extruded bundle 22 by spraying with or immersing the bundle 22 in fluid such as water. The cooled extruded bundle 23 is pulled along by a pulling section 28. Preferably, the process 2 operates as a high-speed pulled-extrusion/pultrusion method similar to that used in the manufacture of conductive wiring. By pulling the cooled extruded bundle 23, the entire length of the micron conductive bundle is placed under tension. This tension allows the overall process to operate at high speeds without kinking or binding.

As an optional feature, the cooled extruded bundle 23 is processed through a control monitor 14 to verify the outer diameter of the cooled extruded bundle 23 and to count the overall length. The cooled extruded bundle 23 is then fed into a segmentation apparatus 16, or pelletizer, where the cooled extruded bundle 23 is segmented into individual moldable capsules 25. The moldable capsules 25 are preferably segmented to a length L of between about 2 millimeters and about 14 millimeters although longer or shorter lengths may be used. The segmenting method may be by cutting, sawing, chopping, stamping, and the like. The moldable capsules 25 retain the same percent, by weight, specification as the cooled extruded bundle 23. The segmented capsules 25 are processed through a classifier 18, separator, or screen, to remove any lose fiber, miss-cut pieces, tape, or other unwanted materials while retaining intact moldable capsules 25. Finally, the classified moldable capsules are packaged 27.

Figure 8:
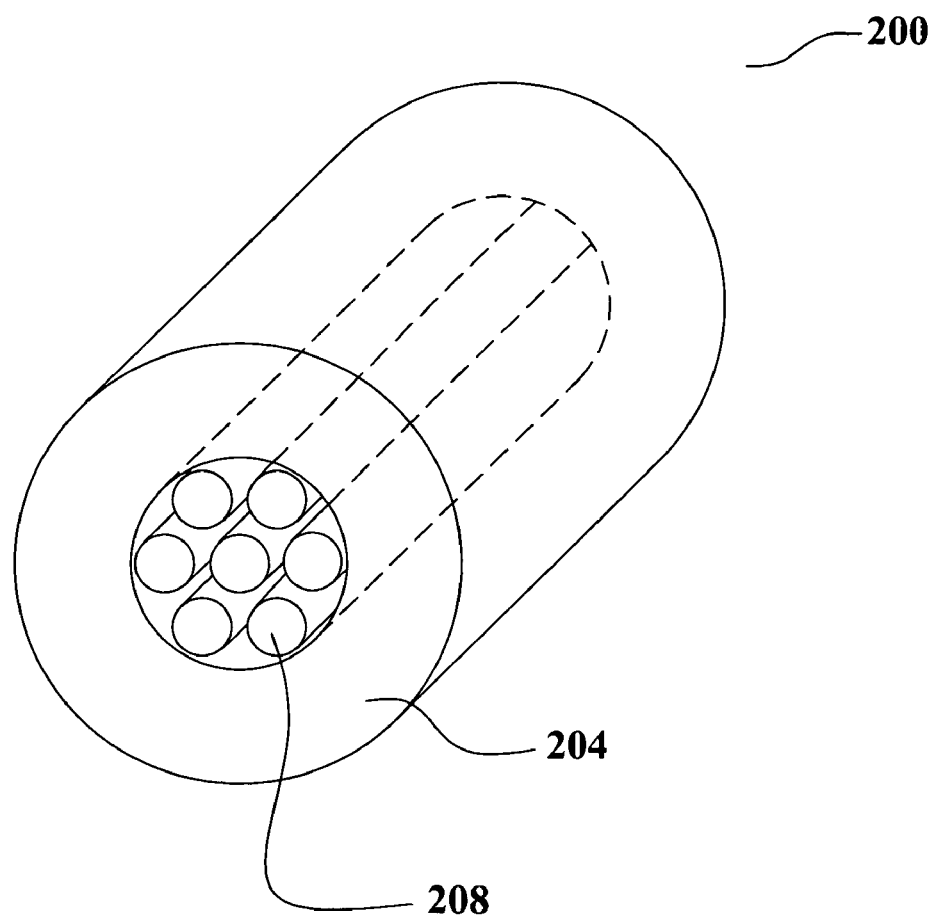
FIG. 8 illustrates a third preferred embodiment of the present invention showing a moldable capsule of the present invention.

Referring now to FIG. 8, a preferred embodiment of a moldable capsule 200 of the present invention is illustrated. Several important features of the present invention are shown and are discussed below. This moldable capsule 200 comprises a micron conductive fiber core 208 with a resin-based material 204 extruded thereon. According to various embodiments, the micron conductive fiber core 208 comprises micron conductive fiber, micron conductive powder, or a combination of micron conductive fiber and powder. The resin-based material 204 preferably comprises a single resin-based polymer material that is moldable. A number of specific resin-based materials 204 useful for this embodiment are described herein. According to other embodiments, the resin-based material 204 further comprises additives, lubricants, colorants, plasticizers, micron conductive fibers and powders, in any combination.

In one embodiment, the moldable capsule 200 preferably comprises a cylindrical or somewhat cylindrical shape. That is, the moldable capsule 200 of the preferred embodiment has a definite length L. The moldable capsule 200 preferably comprises a length L of between about 2 millimeters and about 14 millimeters although longer or shorter lengths may be used. Further, the moldable capsule has a generally circular cross section. However, other cross sectional shapes may be used, such as rectangular, polygonal, or even amorphous. In one embodiment, the core 208 comprises a circular cross section as is common to wire. In another embodiment, the core 208 comprises a square or a rectangular cross section. In yet another embodiment, the core 208 comprises a ribbon-like cross section. The resin-based material 204 surrounds or encases the core 208 along the longitudinal axis. In addition, the resin-based material 204 may permeate the fiber core 208. The core 208 may be, and in the preferred embodiment is, exposed at the ends of the moldable capsule 200. This embodiment 200 of the present invention is consistent with the preferred method of formation by pultrusion and sectioning as is further described below.

The percentage, by weight, of the conductive element core 208 of the moldable capsule 200 is carefully controlled. More particularly, in one embodiment, the fiber core 208 comprises between about 20% and about 50% of the total weight of the capsule. In a more preferred embodiment, the conductive element core 208 comprises between about 20% and about 40% of the total weight of the capsule. In a yet more preferred embodiment, the fiber core 208 comprises between about 25% and about 35% of the total weight of the capsule. In a yet more preferred embodiment, the conductive element core 18 comprises about 30% of the total weight of the capsule.

By carefully controlling the percentage, by weight, of the fiber core 208 in the moldable capsule 200 within the above-described ranges, the present invention creates a novel moldable capsule 200. This moldable capsule 200 has a unique formulation and exhibits several exceptional and unexpected features not found in the prior art. The moldable capsule 200 of the present invention utilizes a much smaller percentage, by weight, of conductive doping than the concentrate pellets of the prior art. The novel formulation of the moldable capsule 200 of the present invention results in a moldable capsule 200 that can be directly molded to form articles without mixing with a pure, or non-loaded, pellet as in the prior art. By substantially reducing the conductive doping in the conductive element core 208, the relative amount of resin-based material 204 available for molding is increased. It is found that the novel formulation of the present invention contains sufficient resin-based material for excellent moldability without the addition of "pure" plastic pellets. This feature reduces manufacturing part count and complexity while eliminating the inter-plastic mismatching, bonding problems, non-homogeneous mixture tendencies, and potentially dangerous chemical interactions found in the prior art. The novel formulation of the present invention insures that articles molded have sufficient resin-based material from the moldable capsule alone to exhibit excellent physical, structural, and chemical properties inherent in the base resin.

Further, the novel formulation moldable capsule 200 of the present invention further provides an optimal concentration of conductive doping to achieve high electrical conductivity and exceptional performance characteristics within the EMF or electronics spectrum(s) for many applications including antenna applications and/or EMI/RFI absorption applications. The novel formulation also results in excellent thermal conductivity, acoustical performance, and mechanical performance of molded articles. The novel formulation creates a conductively doped composition and a doping concentration that creates an exceptional conductive network in the molded article. The novel formulation insures that the resulting molded article achieves sufficient conductive doping from the moldable capsule, alone, to exhibit excellent electrical, thermal, acoustical, mechanical, and electromagnetic properties from a well-formed conductive network within the resin-based polymer matrix.

Further, the novel formulation of the present invention creates a moldable capsule 200 exhibiting an optimal, time release capability. The moldable capsule 200 incorporates a relatively large amount of resin-based material 204 extruded onto and permeating into the micron conductive fiber core 208. The greater amount, by weight, of resin-based material 204, when compared to the prior art, results in a larger volume of resin-based material that must melted in the mixing and compression section of an extruder prior to fiber release. As a result, an optimal time release property is achieved. The inner micron conductive fiber is dispensed and dispersed into the melted composite mixture at the right time and place in the mixing/molding cycle to minimize extruder induced damage to the fiber. Therefore, the moldable capsules can be mixed, melted, and substantially homogeneous more easily without damaging the fiber doping. Problems of non-homogenous mixing, fiber damage, fiber clumping, ganging, balling, swirling, hot spots and mechanical failures are eliminated.

The pre-compression of the micron conductive fiber of the moldable capsule further facilitates excellent release of the fiber from the resin-based material during melting and mixing. The release, or separation, of the fiber strands of conductive element(s) 208 from the outer, resin-based material 204 is a critical stage in preparing a conductively doped, resin-based material for molding. The release and substantial homogenization of fiber and polymer affects not only the structural integrity of the molded conductively doped resin-based material, but also affects material conductivity. If the fiber separation is too fast, as in the prior art, the fiber will experience undo breakage, disruptive orientation, and will not be homogenized with the base resin evenly. These detrimental effects are due to the combination of high rotation speed of the screw, barrel friction, nozzle design and other pressures or forces exerted on the materials during mixing, melting, and compression prior to injection into a die or mold. The novel formulation of the moldable capsules 200 of the present invention controls the timing sequence and the orientation for the fiber 208 release cycle to thereby accurately and evenly dispense the conductive elements within the base resin. As a result, an excellent conductive network is substantially homogeneously formed in the molded article.

Further, the novel formulation of the moldable capsule 200 of the present invention is very well suited for use with a micron conductive fiber core 208 comprising micron conductive fibers. The orientation of the micron conductive fibers, such as random, omni-directional, or parallel, in the molded conductively doped resin-based article can significantly affect the performance of the article. As is known in the art, mold design, gating, protrusion designs, or other means within the molding apparatus, may be used to control the orientation of dopant materials incorporated into a resin-based material. The timed-release moldable capsules 200 of the present invention are particularly useful in facilitating the ability to control fiber directionality due to the ease with which initial homogenization occurs without over-mixing.

Further, the novel formulation of the moldable capsule 200 of the present invention provides a homogeneously mixed composite material of conductive elements and base resin that is optimized to maximize molecular interaction between the base resin polymer and the conductive elements. Equalization and intertwining of the network of conductive elements with the base resin molecular chains results in enhanced molecular properties in the base resin polymer chain including physical, electrical, and other desirable properties.

The conductive fiber of the present invention creates a high aspect ratio conductive element such that individual fiber elements easily overlap with each other. As a result, the conductive lattice exhibits electron exchange capability on par with low resistance, pure metals such as copper. By comparison, conductive powders present essentially no aspect ratio for overlapping. Therefore, a very high conductive powder doping must be used to generate a low resistance molded material. However, this doping must be so large that it disrupts the resin polymer chain structures and results in a molded part with very poor structural performance. Conductive flakes present a better aspect ratio than powders but still do not provide the combined low resistance and sound structural performance found in the present invention.

Further, the novel formulation of the moldable capsule 200 of the present invention is compatible with, and extendable in scope to, micron conductive fiber core 208 comprises a variety of micron conductive fibers, a variety of micron conductive powders, and a variety of combinations of micron conductive fibers and/or powders. The micron conductor fibers each have a diameter of between about 3 microns and 12 microns, and typically in the range of between about 6 and 12 microns. The overall bundle, or cord, comprises many individual fiber strands routed together in parallel. Hundreds, thousands, or tens of thousands of fibers are thus routed to form the cord. The length of the conductive element core corresponds roughly to the length of the moldable capsule since a common segmentation step cuts through both the conductive element core and the outer resin-based material.

The conductive element core 208 comprises conductive fiber and/or conductive powder. In one embodiment of the present invention, the conductive fiber and/or conductive powder comprise metal material. More particular to the present invention, this metal material is preferably in any form of, but not limited to, pure metal, combinations of metals, metal alloys, metal-clad onto other metal, and the like. More particular to the present invention, this metal material is combined with the resin-based material using an extrusion/pultrusion method as illustrated herein in FIGS. 1, 7, and 9-11. As is described in these embodiments, the conductive element core preferably begins as a bundle of very fine wire called a micron fiber bundle. The resin-based material is extruded onto this micron fiber bundle and then segmented to form the novel molding capsules of the present invention.

There are numerous metal materials that can be used to form the micron fiber bundle according to the present invention. An exemplary list of micron wire materials includes:

(1) copper, alloys of copper such as coppered alloyed with any combination of beryllium, cobalt, zinc, lead, silicon, cadmium, nickel, iron, tin, chromium, phosphorous, and/or zirconium, and copper clad in another metal such as nickel;

(2) aluminum and alloys of aluminum such as aluminum alloyed with any combination of copper, magnesium, manganese, silicon, and/or chromium;

(3) nickel and alloys of nickel including nickel alloyed with any combination of aluminum, titanium, iron, manganese, and/or copper;

(4) precious metals and alloys of precious metals including gold, palladium, platinum, platinum, iridium, rhodium, and/or silver;

(5) glass ceiling alloys such as alloys of iron and nickel, iron and nickel alloy cores with copper cladding, and alloys of nickel, cobalt, and iron;

(6) refractory metals and alloys of refractory metals such as molybdenum, tantalum, titanium, and/or tungsten;

(7) resistive alloys comprising any combination of copper, manganese, nickel, iron, chromium, aluminum, and/or iron;

(8) specialized alloys comprising any of combination of nickel, iron, chromium, titanium, silicon, copper clad steel, zinc, and/or zirconium;

(9) spring wire formulations comprising alloys of any combination of cobalt, chromium, nickel, molybdenum, iron, niobium, tantalum, titanium, and/or manganese;

(10) stainless steel comprising alloys of iron and any combination of nickel, chromium, manganese, and/or silicon;

(11) thermocouple wire formulations comprising alloys of any combination of nickel, aluminum, manganese, chromium, copper, and/or iron Within this preferred embodiment wherein the conductively doped material comprises a micron wire bundle, it is common to specify this type of material in terms of feet per pound. It is relatively straightforward to convert the desired percent by weight, of the conductive doping into the feet per pound regime. When the micron wire bundle is encapsulated in the resin-based material, yet prior to segmentation, the combined micron wire bundle and base resin combination bears a combined feet per pound ($X_{Total}$). The original feet per pound of the micron wire bundle only ($X_{Wire}$) should be known. By inverting these quantities, the weight per foot of each can be derived as $1/X_{Total}$ and $1/X_{Wire}$. The desired percent weight of conductive doping can then be selected according to:

Percent weight=$(1/X_{Wire})/(1/X_{Total})$.

Referring again to FIG. 8, in another preferred embodiment, the conductive element core 208 comprises a combination of micron conductive fiber and micron conductive powder. A number of specific micron conductive fibers and micron conductive powders useful for this embodiment are described herein. Again, the micron conductive fiber preferably comprises a bundle, or cord, of fibers stacked or routed in parallel or twisted around a central axis. In the illustration, a few such micron conductive fibers are shown. In practice, hundreds, or tens of thousands of fibers are used to create a bundle or cord. If combined with a cord of micron conductive fibers, the micron conductive powder is preferably leached into the cord of fibers as is described above. The micron conductive powder, along with the micron conductive fiber, acts as a conductor in the conductive network of the resulting molded article. In this case, the percentage, by weight, of the combined micron conductive fiber and micron conductive powder in the moldable capsule is formulated and controlled within the ranges herein described. In addition, the micron conductive powder may act as a lubricant in the molding machine.

As another preferred embodiment, the resin-based material 204 is further loaded with micron conductive powder as described in the method above. Again, the micron conductive fiber 208 in the core preferably comprises a bundle, or cord, of fibers stacked or routed in parallel or twisted around a central axis. In the illustration, a few such micron conductive fibers are shown. In practice, hundreds, or tens of thousands of fiber strands are used to create a bundle or cord. The micron conductive powder in the resin-based material 204 is released when the resin-based material 204 melts. The micron conductive powder acts as a conductor, along with the micron conductive fiber 208, in the conductive network of the resulting molded article. Again, the percentage, by weight, of the combined micron conductive fiber 208 and micron conductive powder in the moldable capsule 200 is formulated and controlled within the ranges herein described. In addition, the micron conductive powder may act as a lubricant in the molding machine.

Figure 2:
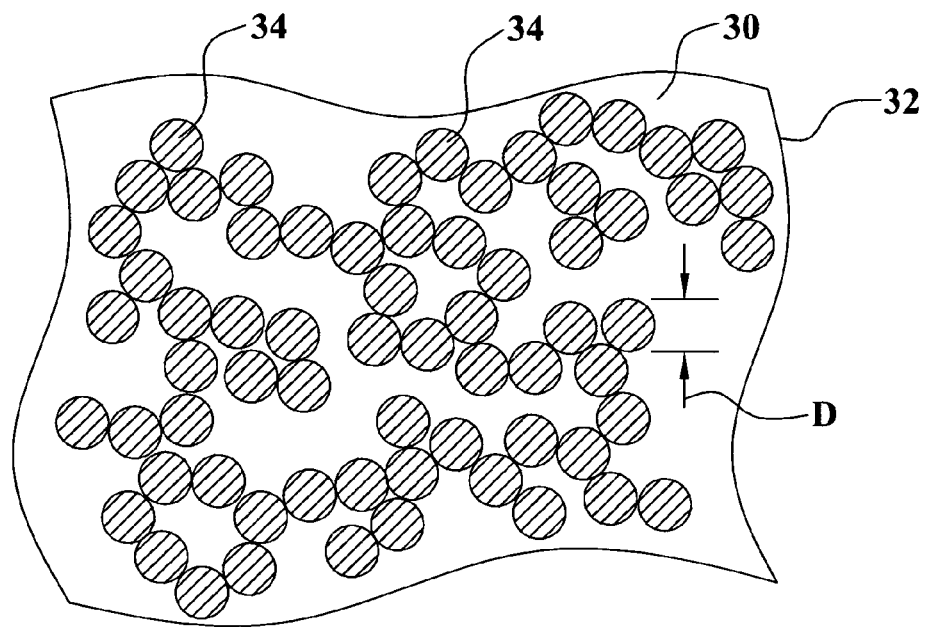
FIG. 2 illustrates a first preferred embodiment of a conductively doped resin-based material wherein the conductive materials comprise a powder.

The several embodiments of moldable capsules according to the present invention are easily molded into manufactured articles by injection molding, extrusion molding, compression molding and the like. The resulting molded articles comprise an optimal, conductively doped resin-based material. This conductively doped resin-based material typically comprises a micron powder(s) of conductor particles and/or in combination of micron fiber(s) substantially homogenized within a base resin host. FIG. 2 shows a cross section view of an example of conductively doped resin-based material 32 having powder of conductor particles 34 in a base resin host 30. In this example the diameter D of the conductor particles 34 in the powder is between about 3 and 12 microns.

Figure 3:
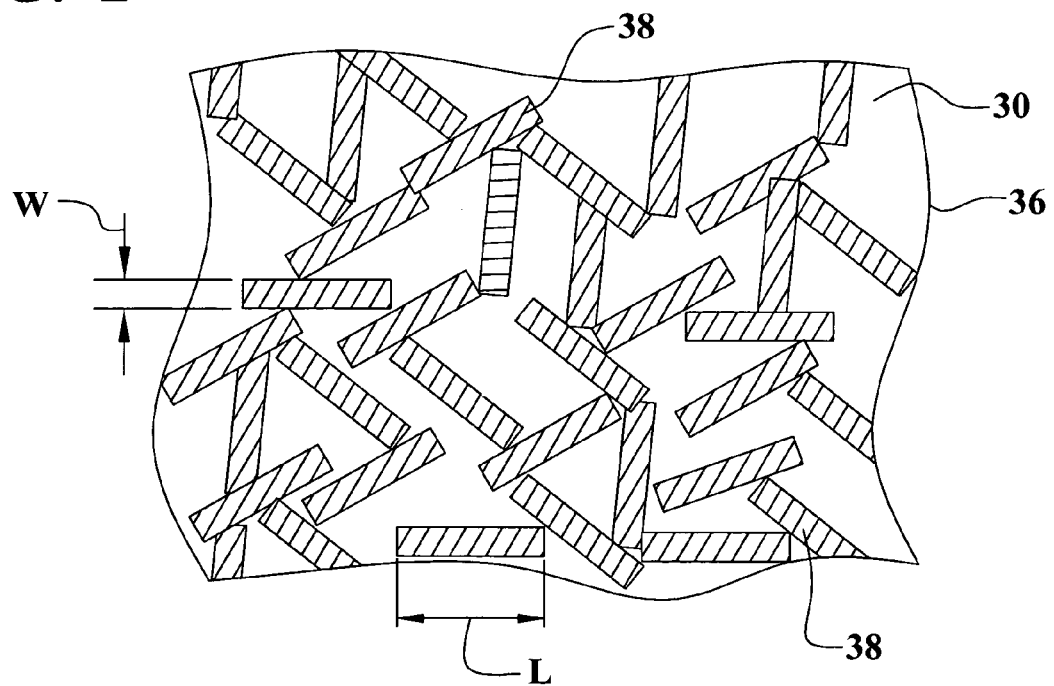
FIG. 3 illustrates a second preferred embodiment of a conductively doped resin-based material wherein the conductive materials comprise micron conductive fibers.

FIG. 3 shows a cross section view of an example of conductively doped resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The micron conductive fibers 38 may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

These conductor particles and/or fibers are substantially homogenized within a base resin. As previously mentioned, the conductively doped resin-based materials have a sheet resistance of less than about 5 to more than about 25 ohms per square, though other values can be achieved by varying the doping parameters and/or resin selection. To realize this sheet resistance the weight of the conductor material comprises between about 20% and about 50% of the total weight of the conductively doped resin-based material. More preferably, the weight of the conductive material comprises between about 20% and about 40% of the total weight of the conductively doped resin-based material. More preferably yet, the weight of the conductive material comprises between about 25% and about 35% of the total weight of the conductively doped resin-based material. Still more preferably yet, the weight of the conductive material comprises about 30% of the total weight of the conductively doped resin-based material. Stainless Steel Fiber of 6-12 micron in diameter and lengths of 4-6 mm and comprising, by weight, about 30% of the total weight of the conductively doped resin-based material will produce a very highly conductive parameter, efficient within any EMF, thermal, acoustic, or electronic spectrum.

In yet another preferred embodiment of the present invention, the conductive doping is determined using a volume percentage. In a most preferred embodiment, the conductive doping comprises a volume of between about 4% and about 10% of the total volume of the conductively doped resin-based material. In a less preferred embodiment, the conductive doping comprises a volume of between about 1% and about 50% of the total volume of the conductively doped resin-based material though the properties of the base resin may be impacted by high percent volume doping.

Figure 4:
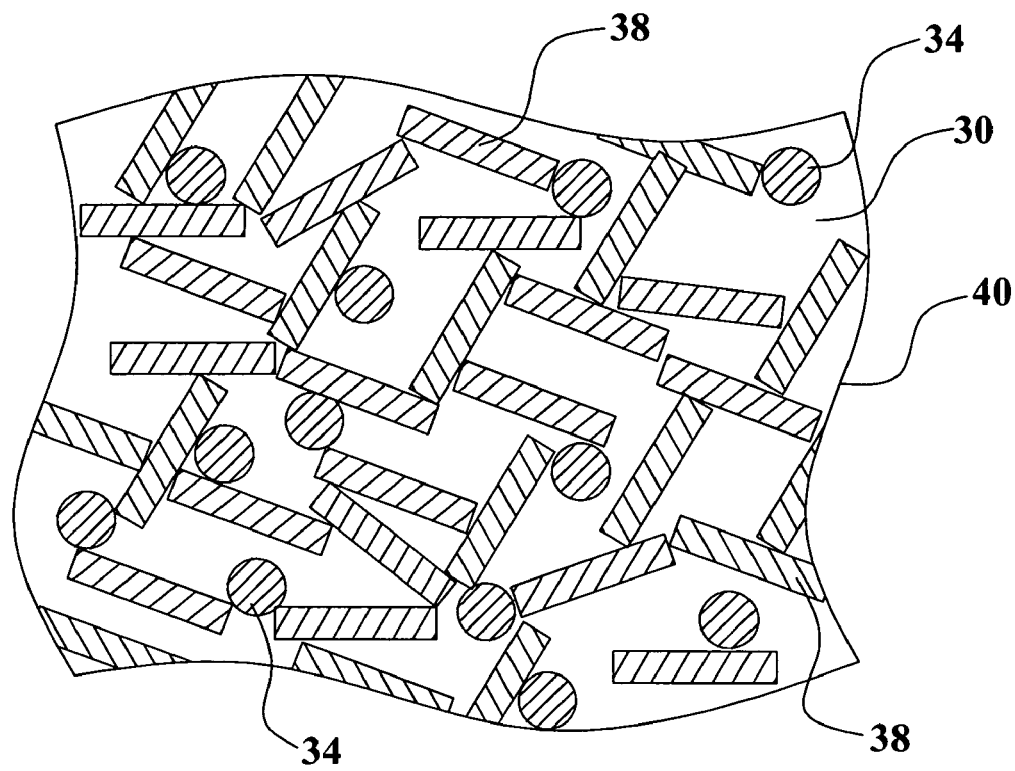
FIG. 4 illustrates a third preferred embodiment of a conductively doped resin-based material wherein the conductive materials comprise both conductive powder and micron conductive fibers.

Referring now to FIG. 4, another preferred embodiment of the present invention is illustrated where the conductive materials comprise a combination of both conductive powders 34 and micron conductive fibers 38 substantially homogenized together within the resin base 30 during a molding process.

Figure 5A:
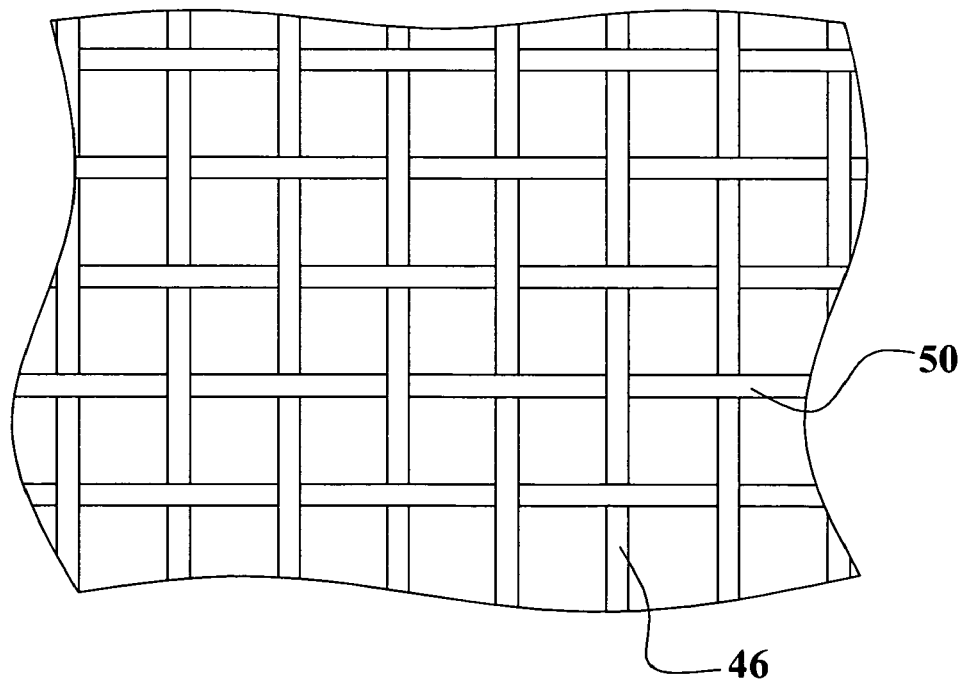

Referring now to FIGS. 5a and 5b, a preferred composition of the conductively doped, resin-based material is illustrated. The conductively doped resin-based material can be formed into fibers or textiles that are then woven or webbed into a conductive fabric. The conductively doped resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), TEFLON, KEVLAR, or any other desired resin-based material(s). This conductive fabric may then be cut into desired shapes and sizes.

Articles formed from conductively doped resin-based materials can be formed or molded in a number of different ways including injection molding, extrusion, calendaring, compression molding, thermoset molding, or chemically induced molding or forming. FIG. 6a shows a simplified schematic diagram of an injection mold showing a lower portion 54 and upper portion 58 of the mold 50. Conductively doped resin-based material is injected into the mold cavity 64 through an injection opening 60 and then the substantially homogenized conductive material cures by thermal reaction. The upper portion 58 and lower portion 54 of the mold are then separated or parted and the articles are removed.

FIG. 6b shows a simplified schematic diagram of an extruder 70 for forming articles using extrusion. Conductively doped resin-based material(s) is placed in the hopper 80 of the extrusion unit 74. A piston, screw, press or other means 78 is then used to force thermally molten, chemically-induced compression, or thermoset curing conductively doped resin-based material through an extrusion opening 82 which shapes the thermally molten curing or chemically induced cured conductively doped resin-based material to the desired shape. The conductively doped resin-based material is then fully cured by chemical reaction or thermal reaction to a hardened or pliable state and is ready for use. Thermoplastic or thermosetting resin-based materials and associated processes may be used in molding the conductively doped resin-based articles of the present invention.

The advantages of the present invention may now be summarized. An effective moldable capsule useful for molding conductively doped resin-based articles is provided. The moldable capsule exhibits optimal properties for time-releasing conductive material into the resin-based material during melting and mixing during the molding cycle. A ratio of conductive doping material and resin-based material for optimal performance of the molded article is pre-formed into the moldable capsule and, particularly, wherein it is not necessary to reduce the concentration of the conductively doped material by mixing with pure plastic pellets. Moldable capsules are realized for various types of conductive loads and various types of base resin. The moldable capsule comprises conductively doped resin-based material. The capsule is easily and predictably manufactured by the method of the invention. The moldable capsule that is extendable to inclusion of more than one type of conductively doped material into the capsule doping. A method to manufacture articles from a moldable capsule comprising a conductively doped resin-based material is achieved. A method to form a moldable capsule with a fiber strand binding process displaying excellent strand holding capability without the use of a strand binding material is achieved. The method results in a moldable capsule having excellent fiber strand release capability.

While the invention has been particularly shown and described with reference to the preferred embodiments thereof, it will be understood by those skilled in the art that various changes in form and details may be made without departing from the scope of the invention.

What is claimed is:

1. A method to form a moldable capsule comprising:
   mechanically compressing together strands of a bundle of micron conductive fiber strands by pulling said bundle through a compression ring of first diameter and causing direct contact between all parts of said compressing ring and said bundle;
   thereafter extruding/pultruding a resin onto said compressed bundle by pulling said compressed bundle through a die of second diameter that is larger than said first diameter; and
   sectioning said extruded/pultruded resin-based material and said bundle into moldable capsules.

2. The method according to claim 1 wherein said step of extruding/pultruding comprises pulling said bundle through a crosshead die.

3. The method according to claim 1 further comprising pre-treating said bundle prior to said step of mechanically compressing.

4. The method according to claim 3 wherein said step of pre-treating comprises leaching micron conductive powder into said bundle.

5. The method according to claim 4 wherein said micron conductive powder comprises metal or metal alloy.

6. The method according to claim 4 wherein said micron conductive powder comprises a non conductive inner core material with outer metal plating or metal alloy plating.

7. The method according to claim 3 wherein said step of pre-treating comprises forming a chemically inert coupling agent onto said micron conductive fiber strands.

8. The method according to claim 3 wherein said step of pre-treating comprises anodizing said micron conductive fiber.

9. The method according to claim 3 wherein said step of pre-treating comprises exposing said micron conductive fiber strands to gas plasma.

10. The method according to claim 1 wherein said step of extruding/pultruding further comprises adding a micron conductive material to said resin and extruding/pultruding the combination of said resin and said micron conductive material onto said compressed bundle.

11. The method according to claim 1 wherein said micron conductive fiber comprises between about 20% and about 50% of the total weight of each said moldable capsule.

12. The method according to claim 1 wherein said micron conductive fiber comprises a metal or alloy of metal.

13. The method according to claim 1 wherein said micron conductive fiber comprises a non-conductive inner core material with outer metal plating or metal alloy plating.

14. The method according to claim 1 wherein said micron conductive fiber comprises a ferromagnetic material.

15. A method to form a moldable capsule comprising:
    mechanically compressing together strands of a bundle of micron conductive fiber strands by pulling said bundle through a compression ring of first diameter and causing direct contact between all parts of said compressing ring and said bundle;
    thereafter extruding/pultruding a resin onto said compressed bundle by pulling said compressed bundle through a die of second diameter that is larger than said first diameter; and
    sectioning said extruded/pultruded resin and said bundle into moldable capsules wherein said micron conductive fiber comprises between about 20% and about 50% of the total weight of each said moldable capsule.

16. The method according to claim 15 wherein said step of extruding/pultruding comprises pulling said bundle through a cross-head die.

17. The method according to claim 15 further comprising pre-treating said fiber bundle prior to said step of compressing.

18. The method according to claim 17 wherein said step of pre-treating comprises leaching micron conductive powder into said bundle.

19. The method according to claim 17 wherein said step of pre-treating comprises forming a chemically inert coupling agent onto said micron conductive fiber strands.

20. The method according to claim 17 wherein said step of pre-treating comprises anodizing said micron conductive fiber strands.

21. The method according to claim 17 wherein said step of pre-treating comprises exposing said micron conductive fiber strands to gas plasma.

22. The method according to claim 15 wherein said step of extruding/pultruding further comprises adding a micron conductive material to said resin and extruding/pultruding the combination of said resin and said micron conductive material onto said compressed bundle.

23. A method to form a moldable capsule comprising:
forming a chemically inert coupling agent onto strands of a bundle of micron conductive fiber;
thereafter mechanically compressing together said strands of said bundle of micron conductive fiber strands by passing said bundle through a compressing ring of first diameter and causing direct contact between all parts of said compressing ring and said bundle;
thereafter extruding/pultruding a resin onto said compressed bundle by pulling said compressed bundle through a die of second diameter that is larger than said first diameter; and
sectioning said extruded/pultruded resin and bundle into moldable capsules.

24. The method according to claim 23 wherein said step of extruding/pultruding comprises pulling said bundle through a cross-head die.

25. The method according to claim 23 wherein said micron conductive fiber comprises between about 20% and about 50% of the total weight of each said moldable capsule.

26. The method according to claim 23 further comprising leaching micron conductive powder into said bundle prior to said step of forming a chemically inert coupling agent.

27. The method according to claim 23 further comprising exposing said micron conductive fiber strands to gas plasma prior to said step of forming a chemically inert coupling agent.

28. The method according to claim 23 wherein said step of extruding/pultruding further comprises adding a micron conductive material to said resin and extruding/pultruding the combination of said resin and said micron conductive material onto said bundle.

* * * * *